(12) United States Patent
Yamauchi

(10) Patent No.: US 8,786,531 B2
(45) Date of Patent: Jul. 22, 2014

(54) PIXEL CIRCUIT AND DISPLAY DEVICE

(75) Inventor: Yoshimitsu Yamauchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 127 days.

(21) Appl. No.: 13/635,740

(22) PCT Filed: Nov. 19, 2010

(86) PCT No.: PCT/JP2010/070675
§ 371 (c)(1),
(2), (4) Date: Sep. 18, 2012

(87) PCT Pub. No.: WO2011/114580
PCT Pub. Date: Sep. 22, 2011

(65) Prior Publication Data
US 2013/0010015 A1   Jan. 10, 2013

(30) Foreign Application Priority Data

Mar. 19, 2010 (JP) ................................ 2010-063594

(51) Int. Cl.
*G09G 3/36* (2006.01)
(52) U.S. Cl.
USPC ............................... 345/90; 345/100; 349/43
(58) Field of Classification Search
USPC ............... 345/90, 91, 92, 100, 204, 214, 690; 349/41, 42, 43, 149; 257/59
See application file for complete search history.

(56) References Cited

U.S. PATENT DOCUMENTS

| 6,064,362 A | 5/2000 | Brownlow et al. |
| 7,362,318 B2 * | 4/2008 | Tobita .......................... 345/204 |
| 7,508,361 B2 | 3/2009 | Uchino et al. |
| 8,059,219 B2 | 11/2011 | Pak |
| 8,232,955 B2 * | 7/2012 | Kwon .......................... 345/101 |

FOREIGN PATENT DOCUMENTS

| JP | 5-142573 A | 6/1993 |
| JP | 10-62817 A | 3/1998 |
| JP | 2005-24698 A | 1/2005 |
| JP | 2009-86620 A | 4/2009 |

OTHER PUBLICATIONS

An International Search Report, dated Jan. 11, 2011, in International Application No. PCT/JP2010/070675.

* cited by examiner

*Primary Examiner* — Abbas Abdulselam
(74) *Attorney, Agent, or Firm* — Lowe Hauptman & Ham, LLP

(57) ABSTRACT

A display device which realizes constant display having multiple tones with low power consumption is provided. A pixel circuit 2 has an internal node N1 holding a pixel data voltage applied to a display element unit 21, a first switch circuit 22 transferring the pixel data voltage supplied from a data signal line SL to the internal node N1 through a series circuit of first and second transistor elements T1 and T2, a second circuit 23 having a third transistor element T3 which communicates between an intermediate node N2 connected with the first and second transistor elements T1 and T2, and a voltage supply line VSL, and a control circuit 24 formed with a series circuit of a fourth transistor element T4 and a first capacitative element C1, holding the pixel data voltage held in the internal node N1 at one end of the first capacitative element C1 through the fourth transistor element T4, and controlling conduction of the third transistor element T3 by a boost voltage applied to the other end of the first capacitative element C1, and the first and second transistor elements T1 and T2 are controlled individually.

16 Claims, 17 Drawing Sheets

PIXEL CIRCUIT AND DISPLAY DEVICE

RELATED APPLICATIONS

The present application is based on International Application No. PCT/JP2010/070675, filed Nov. 19, 2010 and claims priority from Japanese Application No. 2010-063594, filed Mar. 19, 2010.

TECHNICAL FIELD

The present invention relates to a pixel circuit and a display device including the pixel circuit and, more particularly, relates to an active matrix liquid crystal display device.

BACKGROUND ART

FIG. 14 illustrates an equivalent circuit of a pixel circuit of a common active matrix liquid crystal display device. Further, FIG. 15 illustrates an example of a circuit arrangement in an active matrix liquid display device of m×n pixels. As illustrated in FIG. 15, a switching element formed with a thin film transistor (TFT) is provided at each intersection of m source lines (data signal lines) and n scanning lines (scan signal lines) and, as illustrated in FIG. 14, a liquid crystal element LC and a retentive capacity Cs are connected in parallel through the TFT. The liquid crystal element LC adopts a layered structure in which a liquid crystal layer is provided between a pixel electrode and a counter electrode (common electrode). In addition, FIG. 15 briefly illustrates only a TFT and a pixel electrode (black rectangular portion) of each pixel circuit. In the retentive capacity Cs, one end is connected to the pixel electrode and the other end is connected to a capacity line LCs to stabilize a pixel data voltage held in the pixel electrode. The retentive capacity Cs provides an effect of suppressing fluctuation of the pixel data voltage held in the pixel electrode due to a leak current of a TFT, fluctuation of an electrical capacitance of the liquid crystal element LC between black display and white display due to dielectric anisotropy of liquid crystal particles, and voltage fluctuation caused by parasitic capacitance between the pixel electrode and a surrounding wiring. By sequentially controlling voltages of scanning lines, the TFTs connected to one scanning line enter a conducted state, and the pixel data voltages supplied to respective source lines are written in corresponding pixel electrodes with respect to each scanning line.

Even when display content is a still image upon normal display of full color display, by repeatedly writing the same display content in the same pixel with respect to each frame while inverting the voltage polarity applied to the liquid crystal element LC, the pixel data voltage held in the pixel electrode is updated, voltage fluctuation of pixel data is minimized, and high quality still image display is secured.

Power consumption for driving a liquid crystal display device is mostly occupied by power consumption for driving source lines by a source driver, and can be roughly expressed by a relational expression shown in following equation 1. In equation 1, P represents power consumption, f represents a refresh rate (the number of times of refresh operations in one frame per unit time), C represents a load capacitance driven by a source driver, V represents a driving voltage of the source driver, n represents the number of scanning lines and m represents the number of source lines. In addition, the refresh operation is directed to canceling fluctuation produced in a voltage (absolute value) corresponding to pixel data applied to the liquid crystal element LC by writing the pixel data again, and returning the voltage to the original voltage state corresponding to the pixel data.

$$P \propto f \cdot C \cdot V_2 \cdot n \cdot m \qquad \text{(Equation 1)}$$

Meanwhile, when a still image is constantly displayed, display content is a still image, and therefore the pixel data voltage does not necessarily need to be updated for each frame. Hence, to further reduce the power consumption of the liquid crystal display device, a refresh frequency upon this constant display is decreased. However, when the refresh frequency is decreased, the pixel data voltage held in the pixel electrode fluctuates due to the leak current of the TFT. Further, the average potential in each frame period decreases, and therefore this voltage fluctuation causes fluctuation of display brightness (the transmittance of liquid crystal) of each pixel, and is observed as a flicker. Furthermore, there is also a concern that, for example, sufficient contract cannot be obtained, and therefore display quality decreases.

Meanwhile, for example, Patent Documents 1 and 2 disclose configurations as a method of solving a problem that display quality decreases due to a decrease in the refresh frequency upon constant display of a still image. According to the configurations disclosed in Patent Documents 1 and 2, a switching element of a pixel circuit illustrated in FIG. 14 is formed with a series circuit of two TFTs (transistors T1 and T2), an intermediate node N2 between the two TFTs is driven to have the same potential as a pixel electrode N1 using a buffer amplifier 50 of a unity gain, and a problem that display quality decreases is solved by substantially suppressing the leak current of the TFT by preventing the voltage from being applied between a source and a drain of the TFT (T2) arranged on a pixel electrode side (see FIGS. 16 and 17).

This is a solution method which takes into account a substantial increase in the leak current of the TFT following an increase in a bias voltage between the source and the drain. As illustrated in FIGS. 16 and 17, according to the configurations disclosed in Patent Documents 1 and 2, although the bias voltage between the source and the drain increases in the TFT (T1) connected to the source line SL and the leak current of the TFT is likely to increase, the leak current is compensated for by the buffer amplifier 50 and does not influence the pixel data voltage held in the pixel electrode N1. According to this configuration with the buffer amplifier 50, a problem that display quality decreases due to a decrease in the refresh frequency is solved, and power consumption is further reduced due to a decrease in the refresh frequency. Further, the configurations disclosed in Patent Documents 1 and 2 can support two or more different voltage states as the pixel data voltage held in the pixel electrode, and can realize high quality constant display having multiple tones with low power consumption.

PRIOR ART DOCUMENT

Patent Document
  Patent Document 1: Japanese Patent Application Laid-Open Publication No. 5-142573
  Patent Document 2: Japanese Patent Application Laid-Open Publication No. 10-62817

SUMMARY OF THE INVENTION

Problems to be Solved by the Invention

However, with the spread of digital content (such as advertisement, news and electronic books) following development of a communication infrastructure, constant display of still images is requested to display images of the digital content on mobile information terminals such as mobile telephones and mobile internet devices (MID). Although such a mobile information terminal which displays digital content uses a liquid crystal display device with low power consumption, a time for displaying still images occupies a large part upon use of the terminal, and therefore lower power consumption is requested upon constant display of a still image.

According to the configurations disclosed in Patent Documents 1 and 2, when the buffer amplifier of the unity gain is ideal, the voltage is not applied between the source and the drain of the TFT forming the switch element arranged on the pixel electrode side, so that it is possible to suppress the leak current of the TFT. On the other hand, when a buffer amplifier formed with two or four TFTs disclosed in Patent Documents 1 and 2 is adopted, an accurate unity gain is not realized unless a threshold voltage of the TFTs forming the buffer amplifier is 0 V, so that leak currents of the TFTs forming the switching element are not sufficiently suppressed, and a pixel data voltage held in the pixel voltage is likely to fluctuate. Furthermore, if the threshold voltage is closer to 0 V, power consumption becomes higher, thereby contradicting with a request for lower power consumption. Further, when the buffer amplifier of the unity gain is formed using an operational amplifier, not only a circuit scale increases, thereby contradicting with a request for lower power consumption, but also the ratio a circuit element area occupies in a pixel circuit is high, an aperture ratio in a transmissive mode decreases and brightness of a display image decreases.

In light of the above problem, it is therefore an object of the present invention to provide a pixel circuit and a display device which can support multiple tone display, and prevent a decrease in display quality with low power consumption.

Means for Solving the Problem

In order to achieve the above object, the present invention provides a pixel circuit having; a display element unit having a unit liquid crystal display element; an internal node forming part of the display element unit and holding a pixel data voltage applied to the display element unit; a first switch circuit having a series circuit of first and second transistor elements, one end connected with a data signal line, and the other end connected with the internal node, and transferring to the internal node the pixel data voltage supplied from the data signal line through the series circuit; a second switch circuit having a third transistor element, one end connected with a predetermined voltage supply line, and the other end connected with an intermediate node which is a connection point where the first and second transistor elements in the series circuit are connected in series; and a control circuit formed with a series circuit of a fourth transistor element and a first capacitative element, holding the pixel data voltage held in the internal node, at one end of the first capacitative element through the fourth transistor element, and controlling conduction of the third transistor element by a boost voltage applied to the other end of the first capacitative element, and in which each of the first to fourth transistor elements has a first terminal, a second terminal, and a control terminal that controls conduction between the first and second terminals, the control terminal of the first transistor element is connected with a first scan signal line setting the first transistor element to a conducted state upon an operation of transferring the pixel data voltage to the internal node, the control terminal of the second transistor element is connected with a second scan signal line setting the second transistor element to a conducted state upon an operation of transferring the pixel data voltage to the internal node, the control terminal of the third transistor element, the second terminal of the fourth transistor element and the one end of the first capacitative element are connected to each other, and form an output node of the control circuit, the first terminal of the fourth transistor element is connected with the internal node, the control terminal of the fourth transistor element is connected with a first control line, the other end of the first capacitative element is connected with a second control line supplying the boost voltage, upon a self-refresh operation of compensating for voltage fluctuation of the pixel data voltage held in the internal node, using a voltage held in the output node, a first control voltage equal to or more than a maximum voltage of the pixel data voltage held in the internal node is applied to the voltage supply line, a voltage setting the first transistor element to a non-conducted state is applied to the first scanning line, and a voltage setting the second transistor element to a conducted state is applied to the second scanning line, and, in a state where the internal node and the output node have the same potential through the fourth transistor element, the fourth transistor element transitions from a conducted state to a non-conducted state, and thereafter the boost voltage is applied to the other end of the first capacitative element, thereby boosting the voltage of the output node to a second control voltage obtained by adding a threshold voltage of the third transistor element to the pixel data voltage held in the internal node.

Further, the pixel circuit having the above features is preferably configured such that, the first switch circuit consists of the series circuit of the first and second transistor elements, and the first terminal of the first transistor element is connected with the data signal line, the second terminal of the first transistor element and the first terminal of the second transistor element are connected with the intermediate node, and the second terminal of the second transistor element is connected with the internal node, and further, the second switch circuit consists of the third transistor element, and the first terminal of the third transistor element is connected with the voltage supply line, and the second terminal of the third transistor element is connected with the intermediate node.

Further, the pixel circuit having the above features preferably further has a second capacitative element having one end connected to the internal node and the other end connected to a third control line or the voltage supply line.

In order to achieve the above object, the present invention provides a display device having a first feature that a plurality of pixel circuits having the above described features are arranged in a row direction and a column direction to form a pixel circuit array, the data signal line is provided for each of columns, the scan signal line is provided for each of rows, the one ends of the first switch circuits in the pixel circuits arranged in the same column are connected to the common data signal line, the control terminals of the first transistor elements in the pixel circuits arranged in the same row are connected to the common first scan signal line, and the control terminals of the second transistor elements in the pixel circuits arranged in the same row are connected to the common second scan signal line, the one ends of the second switch circuits in the pixel circuits arranged in the same row or the same column are connected to the common voltage supply line, the control terminals of the fourth transistor elements in the pixel circuits arranged in the same row or the same column are connected to the common first control line, the other ends of the first capacitative elements in the pixel circuits arranged in the same row or the same column are connected to the common second control line, and the display device has a data signal line drive circuit individually driving the data signal lines, a scan signal line drive circuit individually driving the first scan signal lines and individually or commonly driving the second scan signal lines, a voltage supply line drive circuit individually or commonly driving the voltage supply lines, and a control line drive circuit individually or commonly driving the first control lines and individually or commonly driving the second control lines.

Further, the display device having the first feature is preferably configured such that, in the pixel circuits arranged in the same row, the one ends of the second switch circuits are connected to the common voltage supply line; in the pixel circuits arranged in the same row, the control terminals of the fourth transistor elements are connected to the common first control line, and in the pixel circuits arranged in the same row, the other ends of the first capacitative elements are connected to the common second control line.

Further, the display device having the first feature includes a second feature that, upon a writing operation of writing pixel data having two tones or more individually in the pixel circuits arranged in one selected row, the scan signal line drive circuit applies a predetermined selected row voltage to the first and second scan signal lines in the selected row to set the first and second transistor elements arranged in the selected row to a conducted state so as to activate the first switch circuits, and applies a predetermined unselected row voltage to the first scan signal line in a row other than the selected row to set the first transistor elements arranged in the anyway row other than the selected row to a non-conducted state so as to deactivate the first switch circuits, and the data signal line drive circuit individually applies a pixel data voltage corresponding to pixel data to be written in the pixel circuit in each column of the selected row, to each of the data signal lines.

Further, the display device having the second feature includes a third feature that, upon the writing operation, the voltage supply line drive circuit applies a first control voltage equal to or more than the maximum voltage of the pixel data voltage held in the internal node, to the voltage supply line connected to the pixel circuits arranged in the selected row, and the control line drive circuit applies a first switch voltage to the first control line connected to the pixel circuits arranged in the selected row, and a first boost voltage to the second control line connected to the pixel circuits arranged in the selected row.

Further, the display device having the third feature is preferably configured such that, upon the writing operation, the voltage supply line drive circuit applies the first control voltage to the voltage supply line connected to the pixel circuits arranged in the row other than the selected row, and the control line drive circuit applies the first switch voltage to the first control line connected to the pixel circuits arranged in the row other than the selected row, and the first boost voltage to the second control line connected to the pixel circuits arranged in the row other than the selected row.

Further, the display device having the third feature is preferably configured such that the first switch voltage is a sufficient voltage to make the fourth transistor element enter a conducted state, and make the internal node and the output node have the same potential.

The display device having one of the first to third features includes a fourth feature that, upon the self-refresh operation which is performed, after a writing operation of writing pixel data individually having two tones or more in the pixel circuits arranged in one selected row is finished in each row or all rows of the pixel circuit array, with respect to the pixel circuits for which the writing operation is finished, the scan signal line drive circuit applies the unselected row voltage to the first scan signal line in at least one control target row for which the writing operation is finished to set the first transistor elements of the pixel circuits arranged in the control target row to a non-conducted state, and applies the selected row voltage to the second scan signal line in the control target row to set the second transistor elements of the pixel circuits arranged in the control target row to a conducted state, the voltage supply line drive circuit applies a first control voltage equal to or more than the maximum voltage of the pixel data voltage held in the internal node, to the voltage supply line connected to the pixel circuits arranged in the control target row, and, in a state where the control line drive circuit applies a first switch voltage setting the fourth transistor elements to a conducted state, to the first control line connected to the pixel circuits arranged in the control target row so that the internal node and the output node have the same potential, the control line drive circuit applies a second switch voltage setting the fourth transistor elements to a non-conducted state to electrically separate the internal node and the output node, and, subsequently, changes a voltage of the second control line connected to the pixel circuits arranged in the control target row from a first boost voltage to a second boost voltage, and boosts a voltage of the output node to a second control voltage obtained by adding a threshold voltage of the third transistor element to the pixel data voltage held in the internal node by way of capacitive coupling through the first capacitative element.

More preferably, the display device having the fourth feature may be configured such that, upon the self-refresh operation, when a certain period of time passes after the voltage of the second control line connected to the pixel circuits arranged in the control target row is changed from a first boost voltage to a second boost voltage, the control line drive circuit performs a refresh canceling operation of returning the voltage of the second control line connected to the pixel circuits arranged in the control target row from the second boost voltage to the first boost voltage and, subsequently, returning the voltage of the first control line connected to the pixel circuits arranged in the control target row from the second switch voltage to the first switch voltage so as to make the internal node and the output node have the same potential, and when a certain period of time passes after the refresh canceling operation, the control line drive circuit performs at least once or more a repeating operation of changing the voltage of the first control line connected to the pixel circuits arranged in the control target row from the first switch voltage to the second switch voltage, changing the voltage of the second control line connected to the pixel circuits arranged in the control target row from a first boost voltage to a second boost voltage and, subsequently, after a certain period of time passes, executing the refresh canceling operation again.

More preferably, the display device having the fourth feature may be configured such that, upon the self-refresh operation, when a certain period of time passes after the voltage of the second control line connected to the pixel circuits arranged in the control target row is changed from a first boost voltage to a second boost voltage, the control line drive circuit performs a refresh canceling operation of changing the voltage of the second scan signal line connected to the pixel circuits arranged in the control target row from the selected row voltage to the unselected row voltage, and returning the voltage of the second control line connected to the pixel circuits arranged in the control target row from the second boost voltage to the first boost voltage, and when a certain period of time passes after the refresh canceling operation, the control line drive circuit performs at least once or more a repeating operation of changing the voltage of the second scan signal line in the control target row from the unselected row voltage to the selected row voltage, changing the voltage of the second control line connected to the pixel circuits arranged in the control target row from a first boost voltage to a second boost voltage and, subsequently, after a certain period of time passes, executing the refresh canceling operation again.

More preferably, the display device having the fourth feature may be configured such that the control line drive circuit performs a first operation of applying the first switch voltage to the first control line connected to the pixel circuits arranged in the control target row so as to make the internal node and the output node have the same potential upon the writing operation with respect to the pixel circuits arranged in the control target row.

More preferably, the display device having the fourth feature may be configured such that, when the control terminals of the fourth transistor elements of the pixel circuits arranged in the same row are connected to the common first control line and the other ends of the first capacitative elements of the pixel circuits arranged in the same row are connected to the common second control line, every time the writing operation is finished with respect to each row of the pixel circuit array, the self-refresh operation may be started for the pixel circuits in the control target row for which the writing operation is finished, without waiting for the writing operation for all rows to be finished.

More preferably, the display device having the fourth feature may be configured such that, when the self-refresh operation is performed after the writing operation is finished for all rows of the pixel circuit array, a first reset voltage equal to or less than a minimum voltage of the pixel data voltage held in the internal node is applied to all of the data signal lines.

Effect of the Invention

The pixel circuit and the display device having the above features can write pixel data in the internal node from a data signal line using the first switch circuit upon either normal display or constant display. That is, in the pixel circuit, conduction/non-conduction of the first and second transistor elements forming the first switch circuit is controlled from an outside through the first and second scan signal lines, and the voltage supplied to the data signal line is controlled from an outside, so that it is possible to control the voltage held in the internal node of each pixel circuit. Consequently, it is naturally possible to perform a refresh operation for a voltage held in the internal node by a writing operation of pixel data according to control from an outside. In this case, the pixel circuit having the above features does not use the second switch circuit for the writing operation and does not also use the control circuit for the original purpose, and therefore functions in the same manner as the pixel circuit illustrated in FIG. 14. In the normal display mode, by performing fine control of the voltage supplied to the data signal line, it is possible to write pixel data with a high tone of full color display by color display using three pixel circuits. Further, by controlling the voltage supplied to the data signal line in multiple tones even upon a constant display mode, it is possible to write pixel data of multiple tones in color display.

In addition, the pixel circuit according to the present invention forms a sub pixel which is a minimum display unit and corresponds to each color of three primary colors (RGB) in case of color display. Hence, in case of color display, pixel data is individual tone data of three primary colors. In addition, when one pixel is displayed by adding a color (or monochromatically) other than the three primary colors, a sub pixel is formed for the added color.

Further, the pixel circuit having the features has the second switch circuit and the control circuit, and, consequently, can maintain the potential of the intermediate node in the first switch circuit in the pixel circuit after the writing operation is finished at the same level as the potential of the internal node immediately after the writing operation, by performing the self-refresh operation according to the following procedure. As a result, by setting the first transistor element of the first switch circuit to a non-conducted state and setting the second transistor element to a conducted state, it is possible to compensate for voltage fluctuation of the internal node produced after the writing operation is finished, from the intermediate node through the second transistor element. Further, it is possible to maintain the potential of the intermediate node at the same level as the potential of the internal node immediately after the writing operation, by performing the self-refresh operation, and the voltage is not applied between the first terminal and the second terminal (that is, the source and the drain) of the transistor element (second transistor element) positioned between the intermediate node and the internal node in a voltage holding state of the internal node where the first and second transistor elements of the first switch circuit are set to a non-conducted state, so that it is possible to suppress the leak current flowing in the transistor element. Consequently, it is possible to suppress fluctuation of the pixel data voltage held in the internal node due to the leak current of the transistor element forming the pixel circuit, and suppress a decrease in display quality.

In the pixel circuit having the above features, by controlling conduction/non-conduction of the fourth transistor element through the first control line, the pixel data voltage held in the internal node can be sampled and held in the output node of the control circuit at which the control terminal of the third transistor element, the second terminal of the fourth transistor element, and one end of the first capacitative element are connected mutually, so that it is possible to set the potential of the output node to a potential which is higher than the potential of the internal node by a threshold voltage of the third transistor element forming the second switch circuit by setting the fourth transistor element to the non-conducted state without influencing the pixel data voltage and adjusting the boost voltage inputted to the other end of the first capacitative element through the second control line. Meanwhile, when the voltage (first control voltage) equal to or more than the maximum voltage of the pixel data voltage is applied from the voltage supply line, a voltage which is lower than the voltage of the output node by the threshold voltage of the third transistor element, that is, the same voltage as the pixel data voltage, is supplied from the voltage supply line to the intermediate node irrespectively of the voltage value of the pixel data voltage held in the internal node. Consequently, by controlling the control circuit through the first control line and the second control line and applying a predetermined voltage to a voltage supply line, the pixel circuit having the features can substantially suppress the leak current of the second transistor element, suppress fluctuation of the pixel data voltage and suppress a decrease in display quality. Further, the second switch circuit and the control circuit do not have a direct current path unlike the configuration of the above conventional technique provided with the buffer amplifier and, consequently, can realize the operation with very low power consumption.

Generally, the threshold voltage of the transistor is defined as a voltage at which the transistor enters an on state where the drain electrode and the source electrode of the transistor are conducted when the voltage having the absolute value equal to or more than the absolute value of the threshold voltage based on the source electrode or the drain electrode (corresponding to the first or second terminal) is applied to the gate electrode of the transistor (corresponding to the control terminal) so that the current flows between the electrodes when the voltage is applied therebetween, and at which the transistor enters an off state where the drain electrode and the source electrode of the transistor are not conducted when the voltage less than the threshold voltage is applied. In addition, the threshold voltage of an N channel type transistor is defined as a positive value, and the threshold voltage of a P channel type transistor is defined as a negative value. However, when the voltage less than the threshold voltage is applied between a gate electrode and a source electrode, a very little leak current flows in an actual transistor compared to the on state. Hence, the threshold voltage is defined as a voltage at which a current exceeding the leak current starts flowing between the drain electrode and the source electrode following an increase in the voltage applied to the gate electrode. Meanwhile, the leak current varies among transistors. Therefore, when the leak current causes a problem, it is necessary to purposely-define the threshold voltage according to a function of a target transistor.

Hence, when only the pixel circuit having the features is taken into account, the features of the circuit configuration include boosting the voltage of the output node (the control terminal (gate electrode) of the third transistor element) to the second control voltage obtained by adding a threshold voltage Vth of the third transistor element to the pixel data voltage held in the internal node. Further, the resulting function and effect are as follows. A case will be described below assuming that the third transistor element is an N channel type transistor.

When the terminal of the third transistor element on the intermediate node side is the source electrode and the terminal on the voltage supply line side is the drain electrode, if the voltage of the intermediate node (which is a potential difference with respect to a predetermined reference potential, and has the same significance as the "potential" when the reference potential is 0 V) decreases by a voltage fluctuation ΔV from the same voltage level as the original pixel data voltage VN1, the voltage between the gate electrode and the source electrode of the third transistor element increases by the voltage fluctuation ΔV higher than the threshold voltage Vth, so that the third transistor element enters the on state. Hence, the current follows from the voltage supply line side to the intermediate node side, and the decreased voltage of the intermediate node increases. Then, the voltage fluctuation ΔV decreases, and therefore the voltage between the gate electrode and the source electrode of the third transistor element decreases toward the threshold voltage Vth. When the voltage of the intermediate node returns to the original pixel data voltage VN1, the third transistor element is in a state where the third transistor element is about to transition from the on state to the off state, and the current supplied from the voltage supply line side to the intermediate node side decreases to the leak current level. First of all, the leak current which causes the voltage fluctuation ΔV flows in the intermediate node, the voltage of the intermediate node is at a voltage level at which the leak current which causes the voltage fluctuation ΔV and the leak current which flows in the third transistor element are balanced and the voltage fluctuation ΔV takes a value close to 0 or virtually 0. Consequently, an object of purposely-defining the threshold voltage Vth according to the function of the target third transistor element is to decrease the voltage fluctuation ΔV compared to the original voltage fluctuation ΔV, and make the decreased voltage fluctuation ΔV small to such an extent that display quality of pixels is not decreased in terms of the visual perception of people. Hence, when the purpose is taken into account, the threshold voltage Vth is defined as a voltage at which the voltage fluctuation ΔV of the intermediate node is 0 V by boosting the voltage of the control terminal (gate electrode) of the third transistor element to the second control voltage obtained by adding the threshold voltage Vth of the third transistor element to the pixel data voltage held in the internal node. Meanwhile, as long as the voltage fluctuation ΔV is equal to or less than a certain allowable voltage range (for example, about several mV to 50 mV) to such an extent that display quality of pixels is not decreased as described above, the voltage fluctuation ΔV matches with the object of the present invention, and the voltage fluctuation ΔV of the threshold voltage Vth according to the above definition is also interpreted as 0 V including an error within a certain allowable voltage range.

MODE FOR CARRYING OUT THE INVENTION

Each embodiment of a pixel circuit and a display device according to the present invention will be described below with reference to the drawings.

First Embodiment

In the first embodiment, a display device according to the present invention (hereinafter, simply "display device") and a circuit configuration of a pixel circuit according to the present invention (hereinafter, "pixel circuit") will be described.

Figure 1:
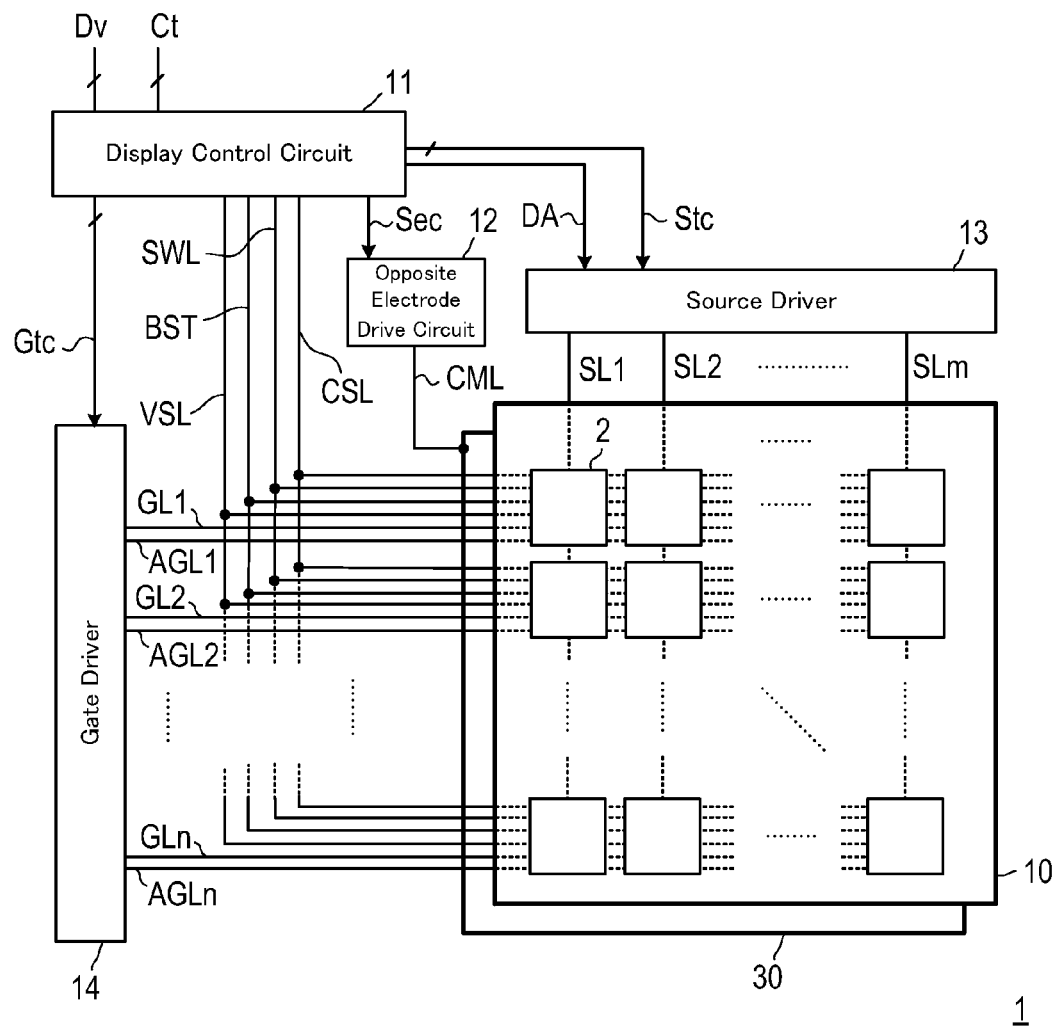
FIG. 1 is a block diagram illustrating an example of a schematic configuration of a display device according to the present invention.

FIG. 1 illustrates a schematic configuration of a display device 1. The display device 1 has an active matrix substrate 10, a counter electrode 30, a display control circuit 11, a counter electrode drive circuit 12, a source driver 13, a gate driver 14 and various signal lines. On the active matrix substrate 10, a plurality of pixel circuits 2 are arranged in a row direction and a column direction to form a pixel circuit array. In addition, in FIG. 1, the pixel circuits 2 are displayed in block units to avoid complication of drawings. Further, FIG. 1 illustrates the active matrix substrate 10 above the counter electrode 30 for the sake of convenience to clearly display that various signal lines are formed on the active matrix substrate 10.

According to the present embodiment, the display device 1 employs a configuration which can display a screen in two display modes of a normal display mode and a constant display mode using the same pixel circuit 2. The normal display mode is a display mode which displays a movie or a still image in full color display, and uses transmissive liquid crystal display using a backlight. Meanwhile, the constant display mode according to the present embodiment is a display mode which displays n tones (n≥2 and, for example, n=4) for each pixel circuit, and allocates three adjacent pixel circuits 2 to each color of three primary colors (R, G and B) and displays 64 colors (in case of n=4). Further, in the constant display mode, it is possible to further combine a plurality of sets of three adjacent pixel circuits and increase the number of display colors by area coverage modulation. In addition, the constant display mode according to the present embodiment is a technique which can be used by transmissive liquid crystal display and reflective liquid crystal display.

In addition, in the following description, for the sake of convenience, a minimum display unit corresponding to one pixel circuit 2 is referred to as a "pixel", and "pixel data" written in each pixel circuit is tone data of each color in case of color display using three primary colors (R, G and B). In addition, upon color display including another color (for example, yellow) and brightness data of black and white in addition to three primary colors, tone data of this another color and brightness data are also included in pixel data.

As described below, the display device 1 can perform a "self-refresh operation" described below in the constant display mode of a still image, substantially reduce power consumption compared to a case where a conventional "refresh operation" is executed. The display device 1 is also naturally applicable to a configuration which provides liquid crystal display using only the constant display mode without using the normal display mode and the constant display mode in combination.

Figure 2:
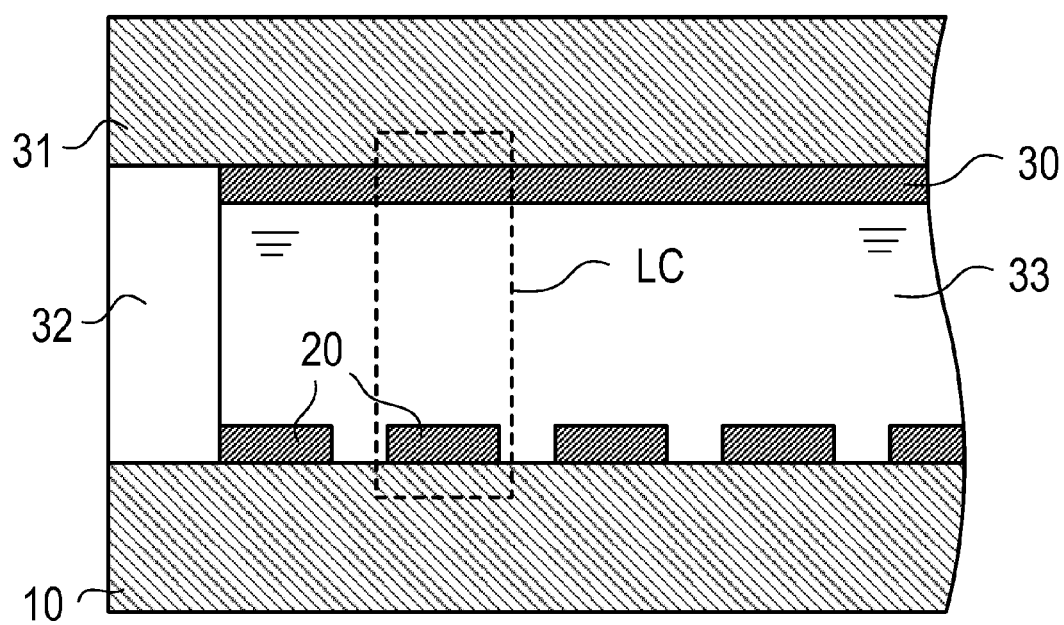
FIG. 2 is a partial cross-sectional schematic structure diagram of a liquid crystal display device.

FIG. 2 is a schematic cross-sectional structure diagram illustrating a relationship between the active matrix substrate 10 and the counter electrode 30, and illustrates a structure of a display element unit 21 (see FIG. 3) which is a component of the pixel circuit 2. The active matrix substrate 10 is an optically transmissive transparent substrate, and is made of, for example, glass or plastic. As illustrated in FIG. 1, the pixel circuits 2 including each signal line are formed on the active matrix substrate 10. FIG. 2 illustrates pixel electrodes 20 which represent components of the pixel circuit 2. The pixel electrode 20 is made of an optically transmissive transparent conductive material such as ITO (indium tin oxide).

An optically transmissive counter substrate 31 is arranged to oppose to the active matrix substrate 10, and a liquid crystal layer 33 is held in a gap between these substrates. Polarizing plates (not illustrated) are attached to outer surfaces of both surfaces.

The liquid crystal layer 33 is sealed by a sealing member 32 in a peripheral portion of both substrates. On the counter substrate 31, the counter electrode 30 which is made of an optically transmissive transparent conductive material such as ITO is formed to oppose to the pixel electrodes 20. This counter electrode 30 is formed as a single film to spread substantially over the counter substrate 31. Meanwhile, one pixel electrode 20, the counter electrode 30 and the liquid crystal layer 33 sandwiched therebetween form a unit liquid crystal display element LC (see FIG. 3).

In addition, a backlight device (not illustrated) is arranged on a back surface side of the active matrix substrate 10, and can emit light in a direction from the active matrix substrate 10 to the counter substrate 31.

As illustrated in FIG. 1, a plurality of signal lines are formed on the active matrix substrate 10 in vertical and horizontal directions. Further, a plurality of pixel circuits 2 are formed in a matrix pattern at portions at which m source lines (SL1, SL2, ... and SLm) extending in the vertical direction (column direction) and n gate lines (GL1, GL2, ... and GLn) extending in the horizontal direction (row direction) to form the pixel circuit array. In addition, m and n are natural numbers equal to or more than 2, respectively. The voltage corresponding to an image to be displayed is applied to the pixel electrode 20 formed in each pixel circuit 2 from the source driver 13 and the gate driver 14 through the source lines SL and the gate lines GL. Further, in the present embodiment, n auxiliary gate lines (AGL1, AGL2, ... and AGLn) extending in the horizontal direction (row direction) are provided in addition to n gate lines. In addition, for the sake of convenience, each source line (SL1, SL2, ... and SLm) is collectively referred to as the "source line SL", each gate line (GL1, GL2, ... and GLn) is collectively referred to as the "gate line GL" and each auxiliary gate line (AGL1, AGL2, ... and AGLn) is collectively referred to as the "auxiliary gate line AGL".

Meanwhile, the source line SL corresponds to the "data signal line", the gate line GL corresponds to the "first scan signal line" and the auxiliary gate line AGL corresponds to the "second scan signal line". The source driver 13 corresponds to a "data signal line drive circuit", the gate driver 14 corresponds to a "scan signal line drive circuit" and part of the display control circuit 11 corresponds to a "control line drive circuit" and a "voltage supply line drive circuit".

In the present embodiment, the signal lines for driving the pixel circuits 2 include a first control line SWL, a second control line BST, an auxiliary capacity line CSL (corresponding to the "third control line") and a voltage supply line VSL in addition to the source line SL and the gate line GL. The auxiliary capacity line CSL is driven by, for example, the display control circuit 11.

Further, although, in the configuration illustrated in FIG. 1, the first control line SWL, the second control line BST, the auxiliary capacity line CSL, and the voltage supply line VSL are provided for each row so as to extend in the row direction, and wirings of respective rows are mutually connected and unified in a peripheral portion of the pixel circuit array, a configuration may be employed where the wirings of respective rows are individually driven, and a common voltage can be applied thereto according to an operation mode. When the "self-refresh operation" described below is collectively executed with respect to the pixel circuits 2 in the pixel circuit array for each row, the first control line SWL, the second control line BST, and the voltage supply line VSL are independently provided in each row so as to extend in the row direction. Further, when the "self-refresh operation" is collectively executed with respect to all pixel circuits 2 in the pixel circuit array or is collectively executed for each column, part or all of the first control line SWL, the second control line BST, and the voltage supply line VSL may be provided in each column so as to extend in the column direction. Furthermore, when the "self-refresh operation" is collectively executed with respect to all pixel circuits 2 in the pixel circuit array or is collectively executed in units of a plurality of rows, the auxiliary gate line AGL may be provided such that the wirings of respective rows are mutually connected and unified in all rows or in units of a plurality of rows in the peripheral portion of the pixel circuit array similar to the first control line SWL and the second control line BST.

The display control circuit 11 is a circuit which controls each writing operation in the normal display mode and the constant display mode described below, and the self-refresh operation in the constant display mode. Upon the writing operation, the display control circuit 11 receives a data signal Dv showing an image to be displayed and a timing signal Ct from an external signal source, and generates a digital image signal DA and a data side timing control signal Stc given to the source driver 13, a scan side timing control signal Gtc given to the gate driver 14, a counter voltage control signal Sec given to the counter electrode drive circuit 12 and each signal voltage applied to the first control line SWL, the second control line BST, the auxiliary capacity line CSL, and the voltage supply line VSL, respectively based on the signals Dv and Ct as signals for displaying an image on the display element unit 21 of the pixel circuit array. In addition, part or the entirety of the display control circuit 11 is preferably formed in the source driver 13 or the gate driver 14.

The source driver 13 is a circuit which applies source signals of a predetermined timing and a predetermined voltage value to each source line SL upon the writing operation and the self-refresh operation according to control by the display control circuit 11. The source driver 13 generates the voltage which is appropriate for a voltage level of a counter voltage Vcom and corresponds to a pixel value of one display line shown by a digital signal DA based on the digital image signal DA and the data side timing control signal Stc upon the writing operation for each horizontal period (also referred to as "1H period") as source signals Sc1, Sc2, ... and Scm. The voltages are analog voltages of multiple tones (a plurality of mutually discrete voltage values) according to the normal display mode and the constant display mode. Further, these source signals are applied to the source lines SL1, SL2, ... and SLm, respectively. Furthermore, the source driver 13 applies the same voltage to all source lines SL connected to the target pixel circuits 2 upon the self-refresh operation according to control by the display control circuit 11 (details will be described below).

The gate driver 14 is a circuit which applies the gate signal and the auxiliary gate signal of a predetermined timing and a predetermined voltage amplitude to each gate line GL and each auxiliary gate line AGL upon the writing operation and the self-refresh operation according to control by the display control circuit 11. Upon the writing operation, the gate driver 14 sequentially selects the gate lines GL1, GL2, ... and GLn and the auxiliary gate lines AGL1, AGL2, ... and AGLn substantially for each horizontal period in each frame period of the digital image signal DA in order to write the source signals Sc1, Sc2, ... and Scm in each pixel circuit 2 based on the scan side timing control signal Gtc. Further, upon the self-refresh operation, the gate driver 14 applies the same voltage to all gate lines GL connected to the target pixel circuits 2 according to control by the display control circuit 11, and performs the voltage control on all auxiliary gate lines AGL connected to the target pixel circuits 2 at the same timing (details will be described below). In addition, the gate driver 14 may be formed on the active matrix substrate 10 similar to the pixel circuit 2. Further, the auxiliary gate lines AGL may be provided such that the wirings of respective rows are mutually connected and unified in all rows or in units of a plurality of rows in the peripheral portion of the pixel circuit array, and may be configured to be driven by the display control circuit 11 instead of the gate driver 14.

The counter electrode drive circuit 12 applies the counter voltage Vcom to the counter electrode 30 through the counter electrode wiring CML. In the present embodiment, the counter electrode drive circuit 12 switches the counter electrode Vcom between a predetermined high level (5 V) and a predetermined low level (0 V) and outputs the counter electrode Vcom in the normal display mode and the constant display mode. Driving the counter electrode 30 by switching the counter voltage Vcom between a high level and a low level in this way is referred to as "counter AC driving". In addition, "counter AC driving" in the normal display mode is directed to switching the counter voltage Vcom between a high level and a low level for each horizontal period and for each one frame. That is, in one given frame, the voltage polarity between the counter electrode 30 and the pixel electrode 20 changes between two adjacent horizontal periods, and, in one same horizontal period, the voltage polarity between the counter electrode 30 and the pixel electrode 20 changes between two adjacent frame periods. In addition, although the same voltage level is maintained in one frame period in the constant display mode, the voltage polarity between the counter electrode 30 and the pixel electrode 20 changes between two adjacent writing operations.

Although, when the voltage of the same polarity is continuously applied to between the counter electrode 30 and the pixel electrode 20, burn-in of a display screen (screen burn-in) occurs and therefore a polarity inverting operation is required, it is possible to reduce the voltage amplitude applied to the pixel electrode 20 in the polarity inverting operation by employing "counter AC driving".

Figure 3:
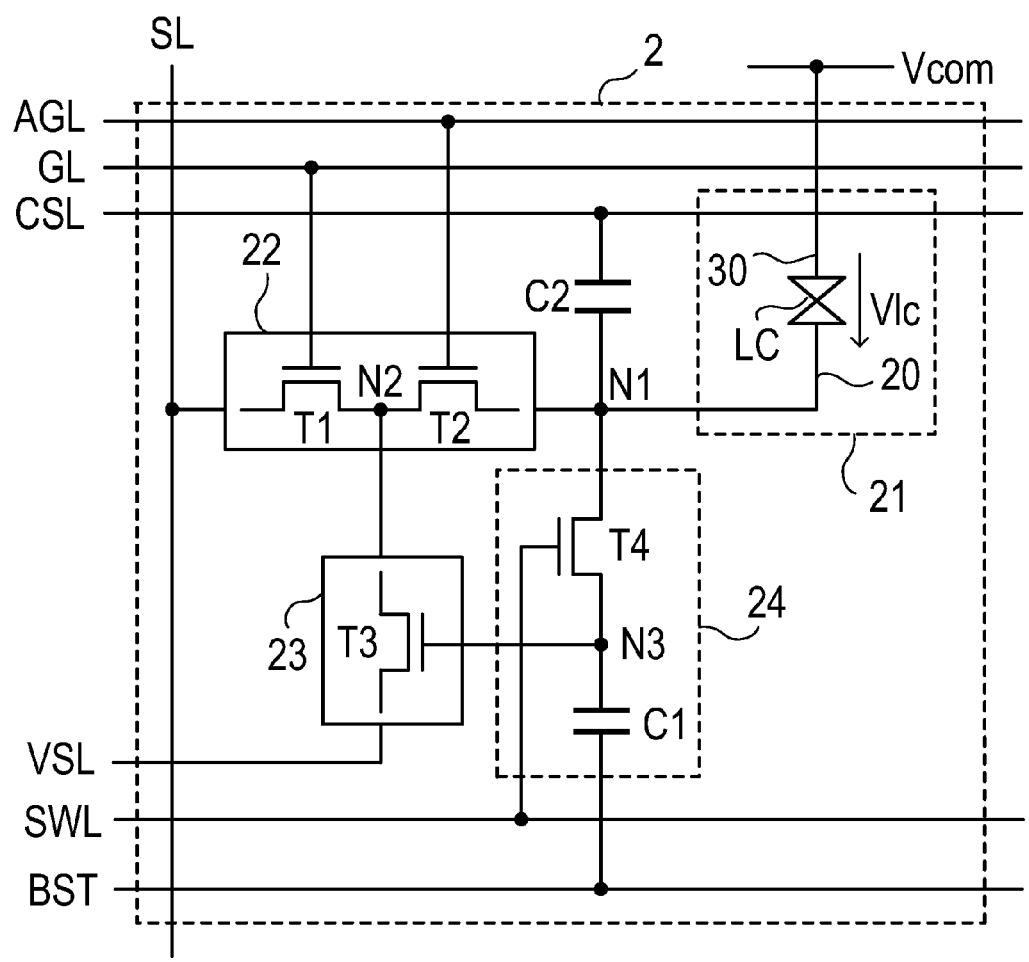
FIG. 3 is a circuit diagram illustrating a basic circuit configuration (first type) of a pixel circuit according to the present invention.

Next, a configuration of the pixel circuit 2 will be described with reference to FIGS. 3 and 4. FIG. 3 illustrates a basic circuit configuration of the pixel circuit 2 according to the present invention. The pixel circuit 2 is configured to have a display element unit 21 which includes a unit liquid crystal display element LC, an auxiliary capacitive element C2

(corresponding to the second capacitative element), a first switch circuit 22, a second switch circuit 23 and a control circuit 24. In addition, the basic circuit configuration illustrated in FIG. 3 is a circuit configuration of an broader concept including a specific circuit configuration example illustrated in FIG. 4 (the simplest circuit configuration example including the auxiliary capacitative element C2). The unit liquid crystal display element LC is as described with reference to FIG. 2, and therefore will not be described.

One end of the first switch circuit 22 and one end of the control circuit 24 are connected with the pixel electrode 20 to form an internal node N1. The internal node N1 holds the pixel data voltage supplied from the source line SL upon the writing operation. The auxiliary capacitative element C2 has one end connected to the internal node N1 and the other end connected to an auxiliary capacity line CSL. The auxiliary capacitative element C2 is supplementarily added to enable the internal node N1 to stably hold the pixel data voltage. In addition, the pixel data voltage is a pixel voltage V20 applied to the pixel electrode 20, and will be referred to as the "pixel voltage V20" below accordingly.

The first switch circuit 22 has the other end connected to the source line SL and at least a series circuit of a transistor T1 (corresponding to the first transistor element) and a transistor element T2 (corresponding to the second transistor element), and a control terminal of the transistor T1 is connected with the gate line GL and a control terminal of the transistor T2 is connected with the auxiliary gate line AGL. At least when the transistor T1 is in the off state, the first switch circuit 22 enters the off state (non-conducted state), and conduction between the source line SL and the internal node N1 is blocked. A connection point N2 for connecting the transistor T1 and the transistor T2 in series is referred to as an "intermediate node N2". In a circuit configuration example illustrated in FIG. 4, the first switch circuit 22 consists of only a series circuit of the transistor T1 and the transistor T2, and a first terminal of the transistor T1 is connected with the source line SL and a second terminal of the transistor T1 is connected with a first terminal of the transistor T2 to form an intermediate node N2 and a second terminal of the transistor T2 is connected with the internal node N1.

The second switch circuit 23 has a transistor T3 (corresponding to a third transistor element), one end connected with the voltage supply line VSL, and the other end connected with the intermediate node N2. A control terminal of the transistor T3 is connected with an output node N3 of the control circuit 24, and the on state (conducted state) of the transistor T3 is controlled according to a voltage state of the output node N3. In the circuit configuration example illustrated in FIG. 4, the second switch circuit 23 consists of only the transistor T3, and a first terminal of the transistor T3 is connected with the voltage supply line VSL and a second terminal is connected with the intermediate node N2.

The control circuit 24 consists of a series circuit of a transistor T4 (corresponding to a fourth transistor element) and a first capacitative element C1, and a first terminal of the transistor T4 is connected with the internal node N1, a second terminal of the transistor T4 is connected with one end of the first capacitative element C1, a control terminal of the transistor T4 is connected with the first control line SWL, and the other end of the first capacitative element C1 is connected with the second control line BST. A connection point of the second terminal of the transistor T4 and one end of the first capacitative element C1 forms an output node N3. The output node N3 has the same potential as the internal node N1 when the transistor T4 is in the on state, a voltage level of the pixel voltage V20 held in the internal node N1 is sampled to the output node N3, and the voltage level of the sampled pixel voltage V20 is held when the transistor T4 enters the off state. By applying a predetermined boost voltage to the second control line BST connected with the other end of the first capacitative element C1, it is possible to change and adjust the voltage level held in the output node N3 by way of capacitive coupling through the first capacitative element C1 and perform fine control of the on state of the transistor T3 of the second switch circuit 23 according to the adjusted voltage level.

The above four types of the transistors T1 to T4 are thin film transistors such as polysilicon TFTs or amorphous silicon TFTs each formed on the active matrix substrate 10, and one of the first and second terminals corresponds to a drain electrode, the other thereof corresponds to a source electrode and a control terminal corresponds to a gate electrode. Further, although each of the transistors T1 to T4 may be formed with a single transistor, when suppression of a leak current upon the off state is highly demanded, a configuration of connecting a plurality of transistors in series and sharing the control terminal may be employed. In addition, the following description of the operation of the pixel circuit 2 assumes that all of the transistors T1 to T4 are N channel type polysilicon TFTs, and the threshold voltage is about 2 V.

Figure 4:
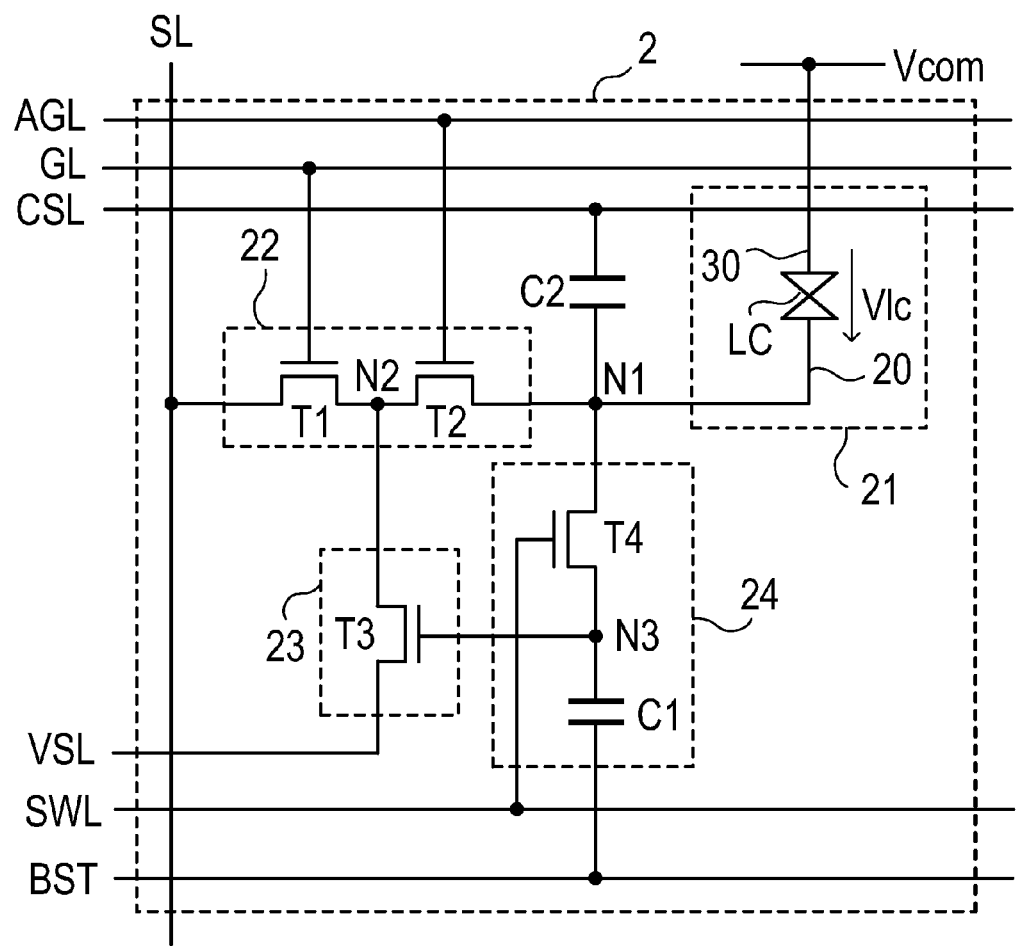
FIG. 4 is a circuit diagram illustrating a circuit configuration example (first type) of the pixel circuit according to the present invention.
Figure 5:
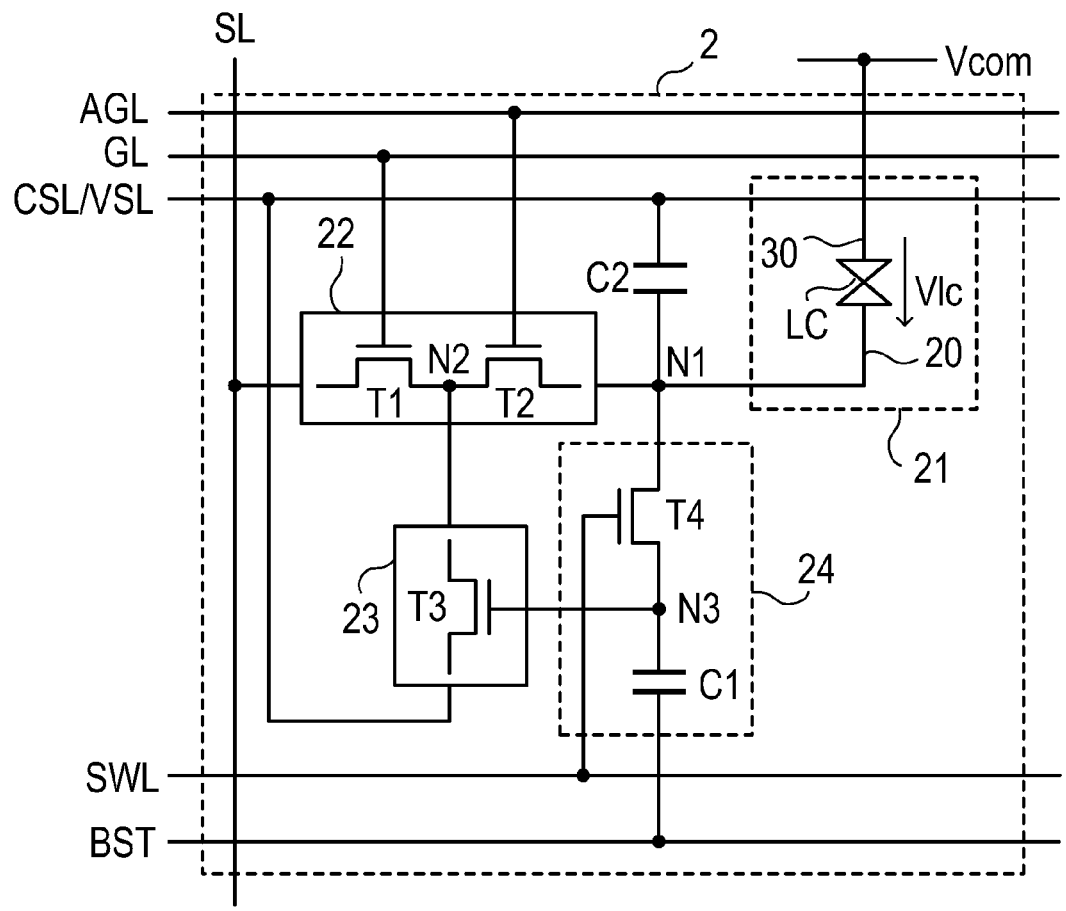
FIG. 5 is a circuit diagram illustrating a basic circuit configuration (second type) of the pixel circuit according to the present invention.
Figure 6:
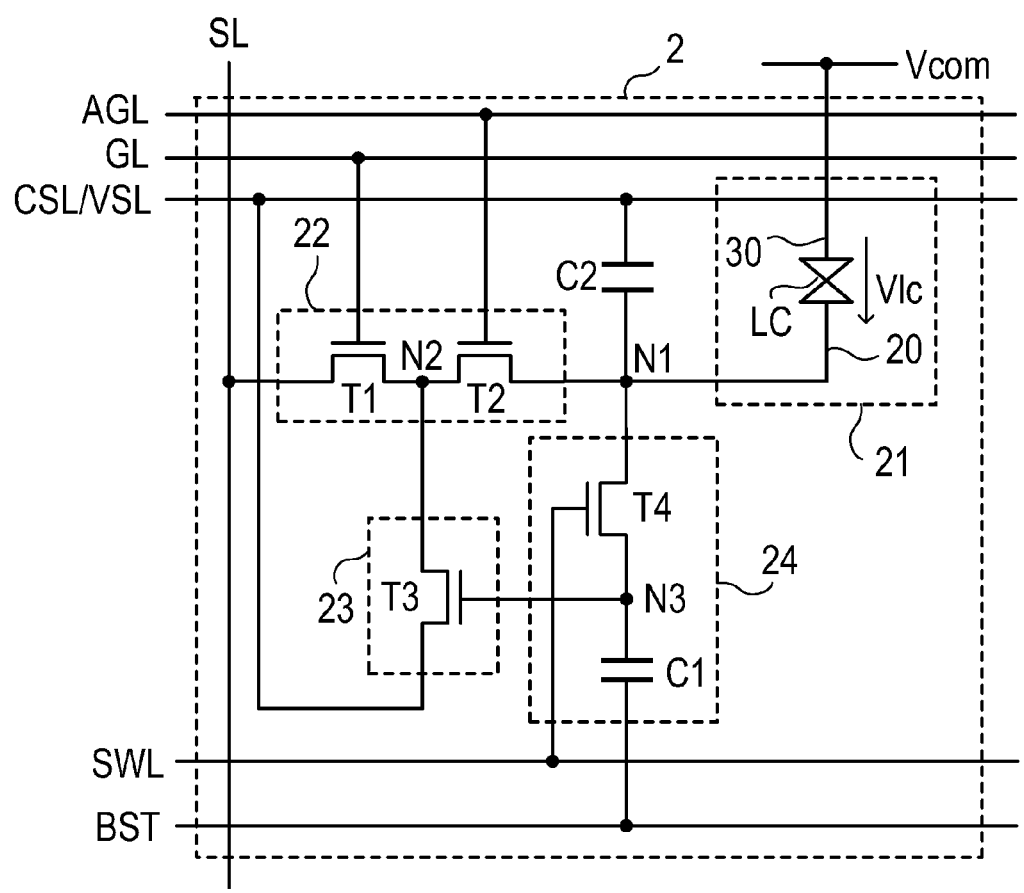
FIG. 6 is a circuit diagram illustrating a circuit configuration example (second type) of the pixel circuit according to the present invention.

Further, as illustrated in FIGS. 5 and 6, the pixel circuit 2 may be configured such that the voltage supply line VSL also serves as the auxiliary capacity line CSL and is referred to as the voltage supply line CSL/VSL, and the other end of the auxiliary capacitative element C2 and one end of the second switch circuit 23 are connected to the same voltage supply line CSL/VSL, compared to the circuit configuration illustrated in FIG. 3 or 4. In this case, in the display device 1 illustrated in FIG. 1, the voltage supply line VSL also serves as the auxiliary capacity line CSL and is referred to as the voltage supply line CSL/VSL. Further, in the circuit configurations illustrated in FIGS. 5 and 6, there occurs limitation that the same voltage applying condition must be applied between the auxiliary capacity line CSL and the voltage supply line VSL in the circuit configurations illustrated in FIG. 3 or 4 upon the writing operation and the self-refresh operation. For ease of description, the circuit configuration illustrated in FIGS. 3 and 4 and the circuit configuration illustrated in FIGS. 5 and 6 are distinguished as a first type and a second type, respectively.

Although it is assumed that the pixel circuit 2 having the circuit configuration illustrated in FIG. 4 or 6 can be modified such that another transistor element is connected to the series circuit of the transistor T1 and the transistor T2 of the first switch circuit 22 in series or such that another transistor element is connected to the transistor element T3 of the second switch circuit 23 in series, upon the writing operation and the self-refresh operation, as long as conduction/non-conduction of the added transistor element is controlled according to conduction/non-conduction of the transistor element positioned on the same side based on the intermediate node N2 of the first switch circuit 22 and the second switch circuit 23, operations of the first and second switch circuits 22 and 23 upon the writing operation and the self-refresh operation are substantially the same between the circuit configuration illustrated in FIG. 4 or 6 and the modified examples, and therefore the writing operation and the self-refresh operation of the pixel circuit 2 will be described below as the following second to sixth embodiments based on the circuit configuration illustrated in FIG. 4 or 6. Meanwhile, in the second type circuit configuration illustrated in FIG. 6, there exists limitation that the same voltage applying condition needs to be applied between the auxiliary capacity line CSL and the voltage supply line VSL as described above, and therefore part of operations of the writing operation and the self-refresh operation are limited, and limitation to the operations will be described in each embodiment as needed.

Second Embodiment

In the second embodiment, a writing operation in a constant display mode will be described with reference to the drawings. Meanwhile, a case will be first described in the second embodiment where the self-refresh operation described below is not executed in parallel in a writing operation for one frame, that is, only the writing operation is executed.

In the writing operation in the constant display mode, pixel data of one frame is divided with respect to each display line in a horizontal direction (row direction), a pixel data voltage (in case of four tones, one of four tone voltages being discrete in a voltage range from a low level (0 V) to a high level (5 V)) corresponding to each pixel data of one display line is applied to the source line SL in each column, a selected row voltage 8 V is applied to the gate line GL and the auxiliary gate line AGL of the selected display line (selected row), the first switch circuits 22 of all pixel circuits 2 in the selected row are set to the conducted state, and the voltage of the source line SL in each column is transferred to the internal node N1 of each pixel circuit 2 in the selected row. An unselected row voltage −5 V is applied to the gate line GL other than the selected display line (unselected row) to set the first switch circuits 22 of all pixel circuits 2 in the selected row to the non-conducted state. Although, in the second embodiment, the auxiliary gate lines AGL are provided for each row and therefore the unselected row voltage −5 V is applied to the auxiliary gate line AGL in the unselected row similar to the gate line GL, it is possible to set the first switch circuit 22 to the non-conducted state only by controlling the gate line GL and it is not necessary at all times to control the auxiliary gate line AGL with respect to each row upon the writing operation.

In addition, the display control circuit 11 illustrated in FIG. 1 controls a timing of applying the voltage to each signal line upon the writing operation described below, and the display control circuit 11, the counter electrode drive circuit 12, the source driver 13 and the gate driver 14 individually apply voltages. Further, the tone voltage is determined based on transmittance characteristics of a liquid crystal layer 33 with respect to a liquid crystal voltage Vlc applied between the pixel electrode 20 and the counter electrode 30 of the unit liquid crystal display element LC. In addition, the liquid crystal voltage Vlc is given as a difference voltage (V20-Vcom) between the counter voltage Vcom of the counter electrode 30 and the pixel voltage V20 held in the pixel electrode 20.

Figure 7:
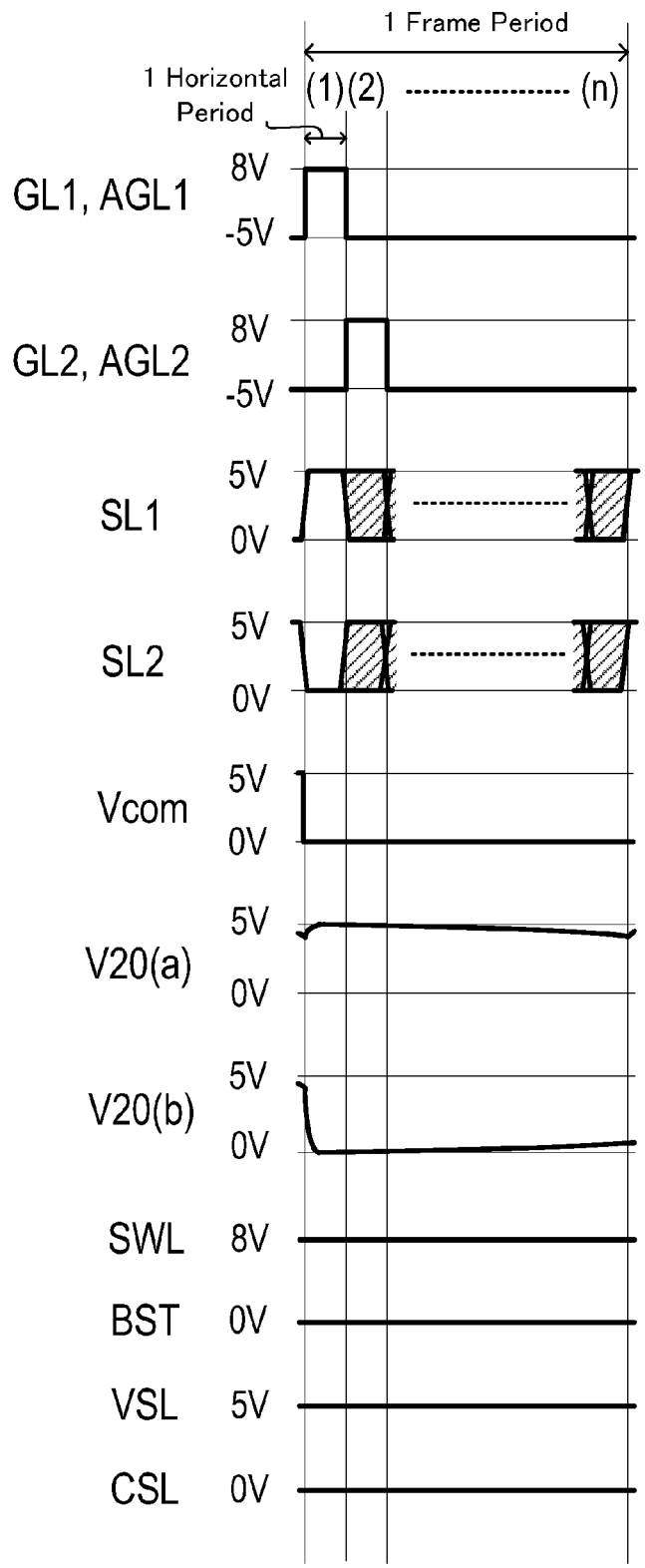
FIG. 7 is a timing diagram of a writing operation of the pixel circuit according to the present invention in a constant display mode.

FIG. 7 illustrates a timing diagram of the writing operation in the constant display mode when a first type pixel circuit is used. FIG. 7 illustrates each voltage waveform of two gate lines GL1 and GL2, two auxiliary gate lines AGL 1 and AGL2, two source lines SL1 and SL2, a first control line SWL, a second control line BST, a voltage supply line VSL, and an auxiliary capacity line CSL, and the voltage waveform of the counter voltage Vcom in one frame period. Further, FIG. 7 illustrates each voltage waveform of the pixel voltages V20 of the internal nodes N1 of the two pixel circuits 2. One of the two pixel circuits 2 is a pixel circuit 2(a) selected by the gate line GL1 and the source line SL1, and the other one is a pixel circuit 2(b) selected by the gate line GL1 and the source line SL2, and the pixel circuits 2 are distinguished by adding (a) and (b) behind the pixel voltages V20 in FIG. 7.

One frame period is divided into horizontal periods the number of which corresponds to the number of gate lines GL, and the gate lines GL1 to GLn to be selected are sequentially allocated to the respective horizontal periods. FIG. 7 illustrates voltage changes in two gate lines GL1 and GL2 and auxiliary gate lines AGL1 and AGL2 in the first two horizontal periods. The selected row voltage 8V is applied to the gate line GL1 and the auxiliary gate line AGL 1 and the unselected row voltage −5 V is applied to the gate line GL2 and the auxiliary gate line AGL2 in the first horizontal period, the selected row voltage 8 V is applied to the gate line GL2 and the auxiliary gate line AGL2 and the unselected row voltage −5 V is applied to the gate line GL1 and the auxiliary gate line AGL1 in the second horizontal period, and the unselected row voltage −5 V is applied to the gate lines GL1 and GL2 and the auxiliary gate lines AGL1 and AGL 2 in subsequent horizontal periods, respectively. A multilayer voltage (0 V to 5 V and is displayed by a cross hatching except in the first horizontal period) corresponding to each of the pixel data of a display line corresponding to each horizontal period is applied to the source line SL in each column (two source lines SL1 and SL2 are illustrated in FIG. 7 as representatives). In addition, in the example illustrated in FIG. 7, voltages of the two source lines SL1 and SL2 in the first horizontal period are separately set to 5 V and 0 V to describe the change of the pixel voltage V20.

Further, as illustrated in FIG. 7, each applied voltage of the first control line SWL, the second control line BST, the voltage supply line VSL, and the auxiliary capacity line CSL is constant through one frame period with the writing operation which is not executed in parallel to the self-refresh operation, and therefore each of the above signal lines has no substantial difference between a case where wirings in respective rows are mutually connected and unified and a case where wirings in respective rows are independently provided. Hence, FIG. 7 illustrates a voltage waveform of the former case.

In the pixel circuit 2, the first switch circuit 22 consists of a series circuit of the transistor T1 and the transistor T2, and conduction/non-conduction of the first switch circuit 22 is controlled by performing on/off control of the transistor T1 and the transistor T2. More specifically, the selected row voltage 8 V is applied to the gate line GL and the auxiliary gate line AGL in the selected row as described above, and the unselected row voltage −5 V is applied to the gate line GL and the auxiliary gate line AGL in the unselected row. In addition, the reason for using −5 V which is a negative voltage as the unselected row voltage −5 V is as follows. That is, while the voltage of the liquid crystal voltage Vlc is maintained in the first switch circuit 22 in the non-conducted state, the pixel voltage V20 is likely to change to the negative voltage following the voltage change of the counter voltage Vcom, and therefore it is necessary to prevent the first switch circuit 22 in the non-conducted state from entering the conducted state unnecessarily in this state.

The second switch circuit 23 needs to be set to the non-conducted state to prevent interference from the voltage supply line VSL in the writing operation. In the second embodiment, the second switch circuit 23 consists of only the transistor T3, and the transistor T3 is substantially set to the off state. When the second terminal and the control terminal of the transistor T3 have the same voltage, the second switch circuit 23 functions as a forward diode from the intermediate node N2 to the source line SL, and the first control voltage (5 V in the second embodiment) equal to or more than the maximum voltage of the pixel data voltage (tone voltage) held in an internal node N1 is applied to a voltage supply line VSL through one frame period to place the diode in an inverse bias state, and set the second switch circuit 23 to a non-conducted state.

8 V (first switch voltage) which is higher than the first control voltage (5 V) by a threshold voltage (about 2 V) or more is applied to the first control line SWL to set a transistor T4 to the on state at all times irrespectively of the voltage state of the internal node N1 during one frame period. By this means, the output node N3 and the internal node N1 are electrically connected, and the output node N3 and the intermediate node N2 also have the same potential. As a result, the second switch circuit 23 enters the non-conducted state as described above. In the second embodiment, the high voltage 8 V is applied to the first control line SWL, and a pixel data voltage (tone voltage) transferred to the internal node N1 by the writing operation of each pixel circuit 2 is sampled to the output node N3 as a preparation operation for collectively executing the self-refresh operation on the pixel circuits 2 of one frame, after the writing operation for one frame period is finished. Further, when the output node N3 and the internal node N1 are electrically connected in a state where the transistor T4 is in the on state at all times, the first capacitative element 1 connected to the internal node N1 through the transistor T4 can be used to hold the pixel voltage V20, which contributes to the stabilization of the pixel voltage V20. Furthermore, the second control line BST is fixed to a predetermined fixed voltage (for example, 0 V: first boost voltage), and the auxiliary capacity line CSL is also fixed to a predetermined fixed voltage (for example, 0 V). Although above counter AC driving is performed for the counter voltage Vcom, the counter voltage Vcom is fixed to 0 V or 5 V during one frame period. In FIG. 7, the counter voltage Vcom is fixed to 0 V.

In addition, a predetermined fixed voltage (0 V in FIG. 7) is applied to the auxiliary capacity line CSL. In case of the second type pixel circuit, the first control voltage (5 V) is applied to the voltage supply line CSL/VSL functioning as the voltage supply line VSL and the auxiliary capacity line CSL. The second type pixel circuit can execute counter AC driving by applying the first control voltage (5 V) to the voltage supply line CSL/VSL instead of giving the same voltage change as the counter voltage Vcom in the counter AC driving operation for each frame period. In addition, by connecting to the transistor T3 in series another transistor element which is turned off upon the writing operation and is turned on upon the self-refresh operation in the second switch circuit 23 employing the circuit configuration illustrated in FIG. 6, it is possible to impart the same voltage change as the counter voltage Vcom to the voltage supply line CSL/VSL upon this counter AC driving.

Third Embodiment

In the third embodiment, a self-refresh operation will be described with reference to the drawings. The self-refresh operation is an operation in a constant display mode, and is an operation of, for a plurality of pixel circuits 2, controlling the on state of a transistor T3 forming a second switch circuit 23 using a voltage Vn3 held in an output node N3 of each pixel circuit 2, supplying the current from the voltage supply line VSL through the transistor T3, an intermediate node N2 and a transistor T2, and collectively compensating for voltage fluctuation produced in the pixel voltage V20 held in the internal node N1 irrespectively of a tone value of a pixel data voltage held in each pixel circuit 2. More specifically, the self-refresh operation is an operation of, in the off state of a transistor T1 of a first switch circuit 22, setting the transistor T2 to the on state, activating a control circuit 24 according to a predetermined sequence, controlling bias states of a first terminal and a control terminal of the transistor T3, maintaining the voltage of the intermediate node N2 to the same or substantially the same voltage as the internal node N1 immediately after the writing operation, and feeding back the voltage of the intermediate node N2 to the internal node N1 in which voltage fluctuation occurs.

In the third embodiment, the self-refresh operation is collectively performed at the same time targeting all the pixel circuits 2 of one frame after the writing operation is finished. Hence, the same voltage is applied to all gate lines GL, auxiliary gate lines AGL, source lines SL, first control line SWL, second control line BST, voltage supply line VSL, auxiliary capacity line CSL, and counter electrode 30 connected to the pixel circuits 2, which are self-refresh operation targets, at the same timing. A display control circuit 11 illustrated in FIG. 1 controls a timing of applying the voltage to each signal line, and the display control circuit 11, a counter electrode drive circuit 12, a source driver 13 and a gate driver 14 individually apply voltages. The self-refresh operation is an operation of the pixel circuit 2 unique to the present invention, and can substantially reduce power consumption compared to the same operation of suppressing a leak current by voltage driving using a buffer amplifier of a unity gain with respect to a conventional intermediate node. In addition, the phrase "at the same time" in the above phrase "collectively . . . at the same time" means "the same time" including a time width of a series of self-refresh operations.

Figure 8:
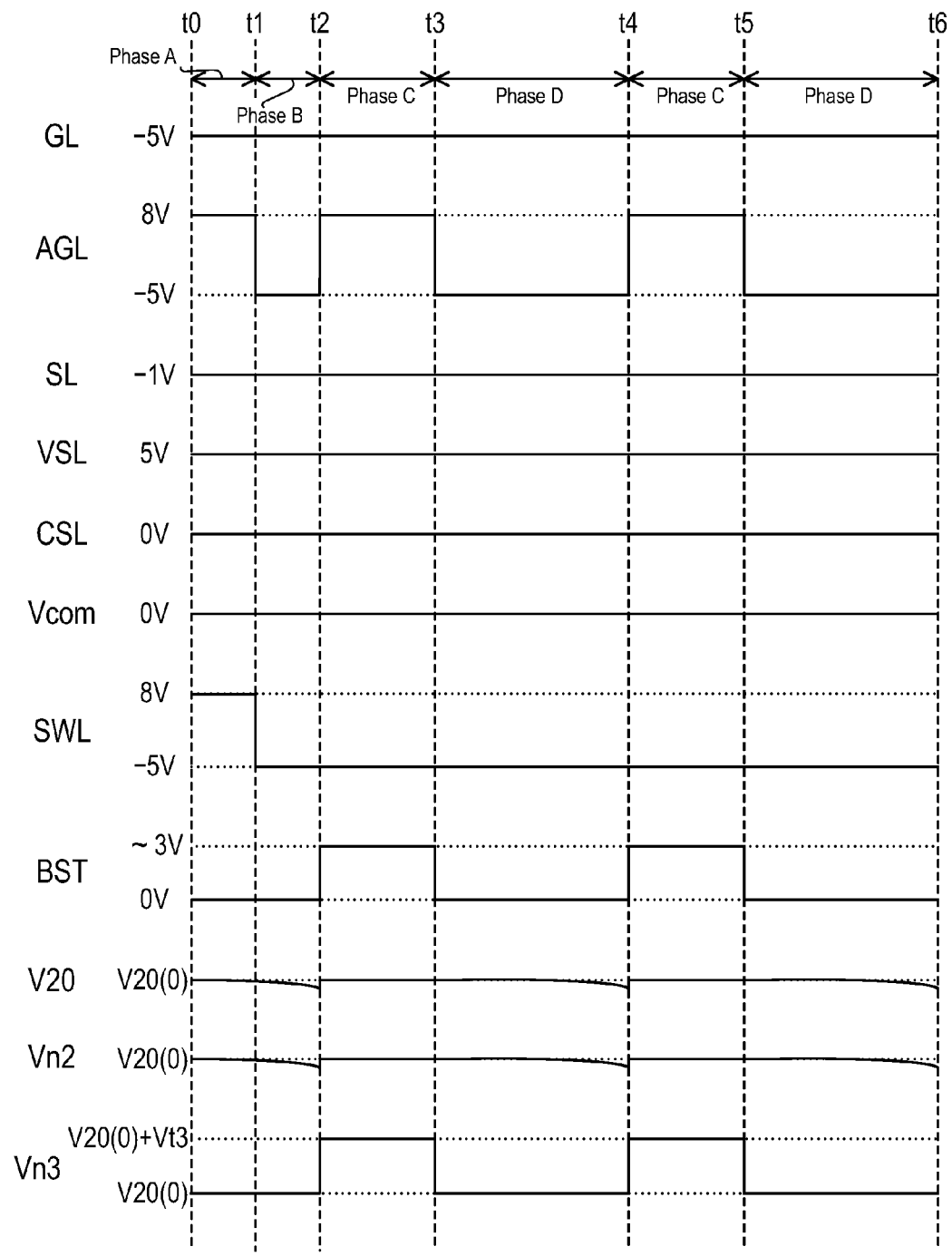
FIG. 8 is a timing diagram illustrating an embodiment of a self-refresh operation of the pixel circuit according to the present invention with respect to each frame.

FIG. 8 illustrates a timing diagram of the self-refresh operation targeting all the pixel circuits 2 of one frame when the first type pixel circuit is used. As illustrated in FIG. 8, although the entire self-refresh operation includes three basic phases (phases A to C), each operation in the phases A and B is an operation of preparing for the self-refresh operation and the operation in the phase C is a main operation. Hereinafter, the operation in the phase C is referred to as a "self-refresh main operation", and is distinguished from the entire self-refresh operation in the phases A to C.

FIG. 8 illustrates each voltage waveform of all gate lines GL, auxiliary gate lines AGL, source lines SL, first control line SWL, second control line BST, voltage supply line VSL, and auxiliary capacity line CSL connected to the pixel circuits 2 which are self-refresh operation targets, and the voltage waveform of a counter electrode Vcom. Further, FIG. 8 illustrates each voltage waveform of a voltage V20 of the internal node N1, a voltage Vn2 of the intermediate node N2, and a voltage Vn3 of the output node N3 assuming that the pixel voltage V20 of the internal node N1 is a high voltage tone. In addition, V20(0) represents the pixel voltage V20 immediately after the writing operation or before voltage fluctuation occurs.

Each voltage of the gate lines GL, the source lines SL, the voltage supply line VSL and the auxiliary capacity line CSL, and the counter voltage Vcom are maintained at a certain voltage through three basic phases (phases A to C). A voltage of −5 V is applied to the gate line GL to set the transistor T1 of the first switch circuit 22 of the operation target pixel circuit 2 to the off state. A first reset voltage (−1 V in the present embodiment) equal to or less than a minimum voltage (0 V in the present embodiment) of the pixel data voltage (tone voltage) held in the internal node N1 (the reason for applying the first reset voltage will be described below) is applied to the source line SL. A first control voltage (5 V in the present embodiment) equal to or more than the maximum voltage (5 V in the present embodiment) of the pixel data voltage (tone voltage) held in the internal node N1 is applied to the voltage supply line VSL. The same voltage continuously from the writing operation is applied to the voltage supply line VSL. The auxiliary capacity line CSL is fixed to a predetermined fixed voltage (for example, 0 V). The counter voltage Vcom is fixed to 0 V or 5 V similar to a voltage upon the writing operation (the counter voltage Vcom is fixed to 0 V in FIG. 8). In addition, although a predetermined fixed voltage (0 V in FIG. 8) is applied to the auxiliary capacity line CSL, and, in case of the second type pixel circuit, the first control voltage (5 V) is applied to the voltage supply line CSL/VSL functioning as the voltage supply line VSL and the auxiliary capacity line CSL.

In the phase A (t0 to t1), a first switch voltage (8V) which sets the transistor T4 to the on state irrespectively of the voltage state of the internal node N1 is applied from the first control line SWL to the control terminal of the transistor T4 in a certain period (t0 to t1) from time t0 immediately after the writing operation is finished, the output node N3 and the internal node N1 are electrically connected, and the pixel voltage V20(0) of the internal node N1 is sampled to the output node N3. Subsequently, in the phase B (t1 to t2), the voltage of the first control line SWL changes from the first switch voltage (8 V) to the second switch voltage (−5 V) at time t1, the transistor T4 is set to the off state, the output node N3 and the internal node N1 are electrically separated, and the pixel voltage V20(0) of the internal node N1 is held in the output node N3. This holding state is continued to time t2 at which the phase C starts. In addition, the pixel voltage V20(0) of the internal node N1 is sampled to the output node N3 upon the writing operation as described above, so that it is possible to skip the sampling period of the phase A (t0 to t1). In this case, when time t0 to t1 overlaps with the writing operation for one row which is the self-refresh operation target or when the selected row voltage 8 V is applied to the auxiliary gate line AGL at time t0 to t1, the auxiliary gate line AGL in this row is changed from the selected row voltage 8 V to the unselected row voltage −5 V at time t1. Further, it is sufficient if the transistor T4 enters the off state, so that the holding period of the phase B (t1 to t2) can be set in a short time in accordance with response characteristics of the transistor T4. In addition, the second control line BST is fixed to the first boost voltage (for example, 0 V) set upon the writing operation during the phase A period.

In addition, during the holding period of the phase B (t1 to t2), voltage fluctuation shown in following equation 2 is caused in a voltage Vn3 (t1) held to the output node N3 by way of capacitive coupling using parasitic capacitance Ct4g between the control terminal and the second terminal of the transistor T4 accompanying the change of the voltage of the first control line SWL from the first switch voltage (8 V) to the second switch voltage (−5 V).

$$Vn3(t1)=V20(0)-\Delta Vswl \cdot Ct4g/(Cbst+Cn3) \quad \text{(Equation 2)}$$

In addition, in equation 2, V20(0) is a pixel voltage held in the internal node N1 and is equal to the voltage of the output node N3 upon sampling, ΔVswl is a voltage difference (13 V) between the first switch voltage (8V) and the second switch voltage (−5V), Cbst is an electrical capacitance of the first capacitative element C1, Cn3 is an electrical capacitance obtained by subtracting the electrical capacitance Cbst of the first capacitative element C1 from the electrical capacitance parasitizing the output node N3 and (Cbst+Cn3) is the total electrical capacitance parasitizing the output node N3. When a parasitic capacitance Ct4g is small to such an extent (for example, about one several thousandth) that the parasitic capacitance Ct4g can be ignored in the total electrical capacitance (Cbst+Cn3) parasitizing the output node N3, the voltage fluctuation in the second term on the right side of equation 2 is within about several mV, so that it can be ignored.

In the phase C (t2 to t3) subsequent to the phase B (t1 to t2), at time t2, a boosting operation of changing the auxiliary gate line AGL from the unselected row voltage −5 V to the selected voltage 8V, and further changing the second control line BST from the first boost voltage to the second boost voltage (for example, about 3 V) is performed. The boosting operation boosts the voltage Vn3 of the output node N3 to a voltage Vn 3 (t2) shown in following equation (3) by way of capacitive coupling of the first capacitative element C1.

$$Vn3(t2)=Vn3(t1)+\Delta Vbst \cdot Cbst/(Cbst+Cn3) \quad \text{(Equation 3)}$$

$$Vn3(t2)=V20(0)+Vt3 \quad \text{(Equation 4)}$$

Meanwhile, a boost voltage difference ΔVbst (=second boost voltage−first boost voltage) corresponding to the capacitive coupling ratio [Cbst/(Cbst+Cn3)] is adequately set such that the right side of equation 3 is equal to the voltage obtained by adding a threshold voltage Vt3 of the transistor T3 to the pixel voltage V20(0) held in the internal node N1, that is, a voltage Vn3(t2) of equation 3 has a relationship represented by above equation 4. The first term on the right side of equation 3 is given from equation 2, and the sum of the second term on the right side of equation 3 and the second term on the right side of equation 2 (minus value) only needs to be the threshold voltage Vt3 of the transistor T3. As described above, when the second term on the right side of equation 2 is small to such an extent that the second term can be ignored, the second term on the right side of equation 3 only needs to be the threshold voltage Vt3 of the transistor T3. According to the boost operation, a voltage obtained by adding the threshold voltage Vt3 of the transistor T3 to the pixel voltage V20(0) is applied to the control terminal of the transistor T3, and a voltage obtained by subtracting the threshold voltage Vt3 from the voltage Vn3(t2) applied to the control terminal of the transistor T3, that is, the pixel voltage V20(0) held in the internal node N1 before voltage fluctuation, is supplied to the intermediate node N2. Although the voltage Vn2 of the intermediate node N2 is the same pixel voltage V20(0) as the internal node N1 immediately after the writing operation, the voltage is likely to fluctuate from the original pixel voltage V20(0) due to the leak current through the transistor T1 caused by fluctuation of the voltage applied to the source line SL. Further, voltage fluctuation of the intermediate node N2 causes voltage fluctuation of the pixel voltage V20 of the internal node N1.

When the original voltage Vn2(0) of the intermediate node N2 decreases from the pixel voltage V20(0), the voltage returns to the original pixel voltage V20(0) through the transistor T3 during the phase C period and the returned pixel voltage V20(0) is fed back to the internal node N1 through the transistor T2 in the on state, so that fluctuation of the pixel voltage V20 produced in the internal node N1 returns to a state immediately after the writing operation. In addition, during the phase C period, the leak current of the transistor T1 is supplied from the transistor T3 side, so that the voltage Vn2(t2) of the intermediate node N2 during the phase C period is maintained to the pixel voltage V20(0) or a neighborhood value. As a result, the voltage V20 of the internal node N1 suppresses significant voltage fluctuation which decreases display quality, and is stably maintained to the originally written pixel voltage V20(0) or its neighborhood value.

FIG. 8 schematically illustrates that the voltage Vn2 of a high voltage tone of the intermediate node N2 returns from a state where the voltage is slightly decreased to the originally written voltage V20(0) according to the boosting operation.

The voltage Vn2 of the intermediate node N2 returns to the originally written voltage V20(0), so that the voltage V20 of the internal node N1 also returns to the originally written voltage V20(0) through the transistor T2.

In a phase D (t3 to t4), a refresh canceling operation for finishing the self-refresh main operation is executed. Consequently, the phase D represents a state after the self-refresh operation is finished. The refresh canceling operation is the same holding operation as in the holding period of the phase B (t1 to t2), and is referred to as the "holding operation" below for the sake of convenience. At time t3, the voltage of the auxiliary gate line AGL is changed from the selected row voltage 8 V to the unselected row voltage −5 V, and the voltage of the second control line BST is changed from the second boost voltage to the first boost voltage and is returned to the state before the boosting operation. By this means, at time t3, the voltage Vn3 of the output node N3 is stepped down by a voltage boosted by the boosting operation in the phase C by way of capacitive coupling of the first capacitative element C1. When the phase C period is shorter to such an extent that the voltage Vn3(t2) of the output node N3 does not decrease due to the leak current of the transistor T4, the voltage Vn3 of the output node N3 changes to the pixel electrode V20(0) immediately after sampling. As a result, in the phase D, both of the transistor T2 and the transistor T4 connected to the internal node N1 enter the off state, and the internal node N1 enters a holding operation state of holding the original pixel voltage V20(0) for which voltage fluctuation is compensated for. Meanwhile, the transistor T4 is in the off state, and therefore the output node N3 also enters the holding operation state of holding the original pixel voltage V20(0).

When the holding operation state of the phase D (t3 to t4) continues for a long time, the voltage Vn2 of the intermediate node N2 is likely to fluctuate due to, for example, the leak current through the transistor T1 of the first switch circuit 22 as described above, and the pixel voltage V20 of the internal node N1 fluctuates in some cases due to voltage fluctuation of the intermediate node N2. Hence, the voltage of the auxiliary gate line AGL is changed from the unselected row voltage −5 V to the selected row voltage 8 V at time t4 after a certain period of time passes from time t3 to compensate for voltage fluctuation of the intermediate node N2 and the internal node N1 in the holding operation period in the phase D (t3 to t4), the boosting operation of changing the voltage of the second control line BST from the first boost voltage to the second boost voltage is performed and the self-refresh main operation in the phase C (t4 to t5) is executed again. The self-refresh main operation in the phase C is as described above, and overlapping description will be skipped. Subsequently, until the next writing operation is started, the self-refresh main operation in the phase C and the holding operation in the phase D are repeatedly executed in order. In addition, the continuing time of the holding operation in the phase D is set according to the degree of voltage fluctuation of the pixel voltage V20 during the holding operation period. Specifically, if the voltage fluctuation is not handled, the voltage fluctuation appears as fluctuation in display brightness of pixels (the transmittance of liquid crystal) and leads to deterioration in display quality. Thus, the continuing time of the holding operation in the phase D is set to the extent that the voltage fluctuation may not cause such a result.

During the self-refresh operation period in the phases A to C and the holding operation period in the phase D, −5 V is applied to the gate line GL to set the transistor T1 of the first switch circuit 22 of the operation target pixel circuit 2 to the off state. Further, during the holding operation period in the phase B and the phase D, −5 V is applied to the auxiliary gate line AGL to set the transistor T2 of the first switch circuit 22 of the operation target pixel circuit 2 to the off state. This is equivalent to that, in a conventional pixel circuit which does not have the second switch circuit 23 and the control circuit 24, when the refresh frequency is decreased upon constant display to reduce the power consumption of a liquid crystal display device, while a given pixel circuit is in a stand-by state until the next writing operation, the same switch circuit is in the non-conducted state, and it is possible in the present embodiment to further reduce the refresh frequency upon constant display without decreasing display quality.

Further, although, during the self-refresh operation period in the phases A to C and the holding operation period in the phase D, the first reset voltage (−1 V in the third embodiment) equal to or less than the minimum voltage of the pixel data voltage (tone voltage) held in the internal node N1 is applied to the source line SL, this reason will be described.

When it is assumed that, during the self-refresh operation, a voltage higher than the minimum voltage of the pixel data voltage (tone voltage) is applied to the source line SL, the pixel voltage V20 lower than the voltage of the source line SL is held in the internal node N1 of the pixel circuit 2 connected to this source line SL in some cases. In this case, the voltage of the intermediate node N2 is equal to the pixel voltage V20 immediately after the writing operation, the leak current of the transistor T1 flows from the source line SL side to the intermediate node N2, and a supply of currents from both of the transistor T1 and the transistor T3 causes fluctuation of the voltage in the intermediate node N2 which voltage is boosted from the same pixel voltage V20 as the internal node N1 immediately after the writing operation. Consequently, by directing an orientation of the leak current of the transistor T1 and an orientation of the current of the transistor T3 in the same direction and balancing the leak current and the current, it is possible to suppress the voltage fluctuation, and maintain the voltage Vn2 of the intermediate node N2 to the same pixel voltage V20 as the internal node N1 immediately after the writing operation or its neighborhood value. That is, by applying the first reset voltage to the source line SL, the above conditions are satisfied.

Meanwhile, when the first reset voltage applied to the source line SL is the same, if the pixel data voltage (tone voltage) held in the internal node N1 is higher, the voltage of the intermediate node N2 is higher, and therefore the leak current of the transistor T1 increases. That is, when the voltage Vn3(t2) of the output node N3 during the phase C period is a sum of the pixel voltage V20 and the threshold voltage Vt3 of the transistor T3, a difference is produced in the leak current of the transistor T1 due to the tone voltage, and therefore a slight difference is produced in the voltage Vn2 maintained in the intermediate node N2. Although, as described above, the tone voltage is determined based on transmittance characteristics of a liquid crystal layer 33 with respect to a liquid crystal voltage Vlc applied to between the pixel electrode 20 and the counter electrode 30 of a unit liquid crystal display element LC, the transmittance characteristics are not necessarily linear, and therefore this voltage fluctuation appears as significant fluctuation of the transmittance of liquid crystal in the intermediate tone voltage. Hence, it is preferable to adjust the boost voltage difference ΔVbst applied to the second control line BST such that the voltage Vn2 maintained in the intermediate node N2 is the pixel voltage V20 held in the internal node N1 in the intermediate tone voltage.

Fourth Embodiment

Figure 9:
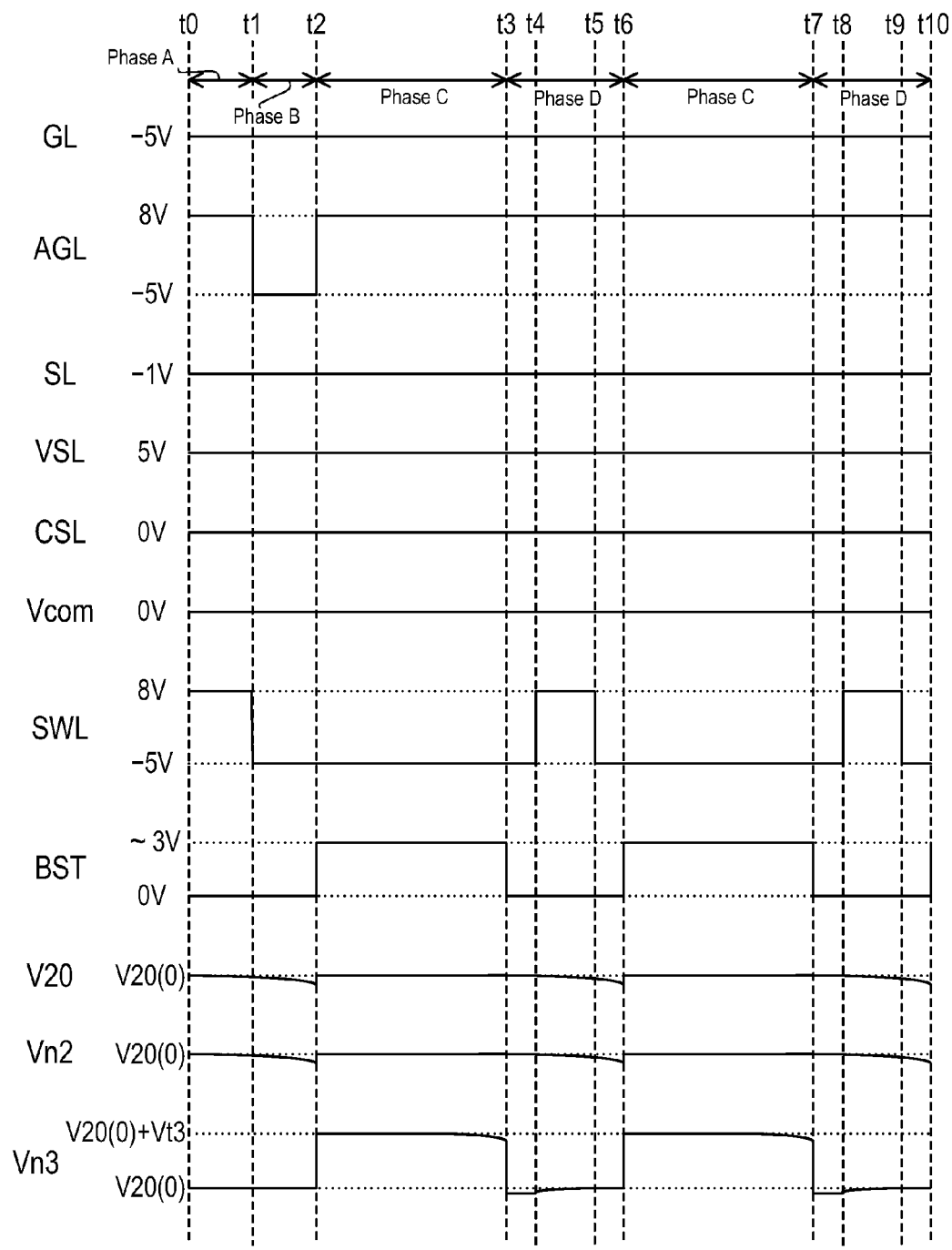
FIG. 9 is a timing diagram illustrating another embodiment of self-refresh operation of the pixel circuit according to the present invention with respect to each frame.

In the fourth embodiment, another embodiment of a self-refresh operation described in the third embodiment will be described with reference to FIG. 9. In the third embodiment, during a holding operation period in a phase D (t3 to t4), the voltage of a first control line SWL is maintained to a second switch voltage (−5 V), and the off state of the transistor T4 is maintained. This assumes a case where a phase C period is short to such an extent that a voltage Vn3(t2) of an output node N3 does not decrease due to the leak current of the transistor T4. However, although the voltage Vn3(t2) of the output node N3 is held by a total electrical capacitance (Cbst+ Cn3) parasitizing the output node N3, when the phase C period becomes longer, the voltage Vn3 is likely to decrease due to the leak current following from the output node N3 of the transistor T4 in the off state to the internal node N1 as time passes, and it is necessary to perform an operation of compensating for a voltage drop of the output node N3 in the phase D. A self-refresh operation according to the fourth embodiment also includes three basic phases (phases A to C) similar to the above third embodiment, and the content of the self-refresh operation is completely the same as that in the third embodiment. As illustrated in FIG. 9, the difference from the third embodiment is an operation (refresh canceling operation) in the phase D. Hence, overlapping description of each operation in phases A to C will be skipped. Further, FIG. 9 is a timing diagram of the self-refresh operation which is created similar to FIG. 8 and which targets all the pixel circuits 2 of one frame when a first type pixel circuit is used.

When the voltage Vn3(t2) of the output node N3 decreases in the phase C, the voltage Vn2 of the intermediate node N2 also decreases following a decrease in the voltage Vn3(t2) due to the leak current of a transistor T1, and therefore the pixel voltage V20 held in the internal node N1 decreases. Hence, within a time set in such a manner such that the voltage Vn3(t2) of the output node N3 does not decrease by 50 mV or more, for example, a boosting state in the phase C is temporarily stopped and the voltage Vn3 of the output node N3 is refreshed. The refresh operation of the voltage Vn3 is realized by executing the phase D (t3 to t6) after the phase C is finished, and subsequently, executing the self-refresh main operation of the phase C again.

In the refresh canceling operation in the phase D (t3 to t6), the same sampling and holding operations as in the phase A and the phase B are executed. After the second control line BST is changed from the second boost voltage to the first boost voltage and is returned to a state prior to the boosting operation at time t3, the first control line SWL is changed from the second switch voltage (−5 V) to the first switch voltage (8 V), the holding state is canceled and the transistor T4 is set to the on state. By this means, at time t3, the voltage Vn3 of the output node N3 is stepped down by a voltage boosted by the boosting operation in the phase B by way of capacitive coupling of a first capacitative element C1. Although, if the voltage Vn3(t2) of the output node N3 slightly decreases due to the leak current of the transistor T4 during the phase B period, the voltage Vn3 of the output node N3 decreases below the pixel voltage V20 immediately after sampling, the pixel voltage V20 of the output node N1 is newly sampled to the output node N3 at time t4 when the transistor T4 enters the on state. Meanwhile, the total electrical capacitance of the internal node 1 is much larger than the total electrical capacitance of the output node N3, so that it is possible to ignore a decrease in the pixel voltage V20 due to the sampling. Subsequently, the voltage of the first control line SWL is changed from a first switch voltage (8 V) to a second switch voltage (−5 V), the transistor T4 is set to the off state, the output node N3 and the internal node N1 are electrically separated, and the pixel voltage V20 of the internal node N1 is held in the output node N3.

It is sufficient that the voltage Vn3 of the output node N3 is stepped down to the pixel voltage V20 and change from a second boost voltage of the second control line BST to a first boost voltage takes place prior to change from the second switch voltage (−5 V) of the first control line SWL to the first switch voltage (8 V), so that the period of t3 to t4 can be set in a short time. Further, it is only sufficient to compensate for a decrease in the voltage of the output node N3, so that a sampling period at time t4 to t5 can be set in a short time. Furthermore, it is sufficient if the transistor T4 enters the off state, so that the holding period of time t5 to t6 can be set in a short time according to response characteristics of the transistor T4. Consequently, when respective periods are set in short times in a period of t3 to t4 and a holding period of time t5 to t6, it is not necessary to purposely change the voltage of an auxiliary gate line from a selected row voltage 8 V to an unselected row voltage −5 V. In the fourth embodiment, the voltage of the auxiliary gate line AGL is maintained at the selected row voltage 8V through the phase C (t2 to t3) and the phase D (t3 to t6). When the holding period of time t5 to t6 is set longer, the voltage of the auxiliary gate line AGL may be changed from the selected row voltage 8 V to the unselected row voltage −5 V as in the phase D according to the third embodiment, and the transistor T2 may be set to the off state.

At time t6 when the phase C (t3 to t6) is finished, a boosting operation of changing the second control line BST from the first boost voltage to the second boost voltage is performed, and the self-refresh main operation in the phase C (t6 to t7) is executed again. The self-refresh main operation differs from the self-refresh main operation in the phase C (t2 to t3) in that, when the holding period of time t5 to t6 is short, the voltage of the auxiliary gate line AGL is maintained at the selected row voltage 8 V, and therefore an operation of changing the voltage from the unselected voltage −5 V to the selected voltage 8 V is not accompanied. However, the self-refresh main operation is the same as the self-refresh main operation in the phase C (t2 to t3) when the voltage of the auxiliary gate line AGL is changed from the selected row voltage 8V to the unselected row voltage −5 V in the holding period of time t5 to t6. Subsequently, until the next writing operation is started, the self-refresh main operation in the phase C and the operation in the phase D are repeatedly executed in order.

Fifth Embodiment

Embodiments have been described in the second to fourth embodiments where a writing operation and a self-refresh operation are performed targeting all the pixel circuits 2 of one frame, and the self-refresh operation for one frame is collectively performed at the same time after the writing operation for one frame is finished. However, even when targeting all the pixel circuits 2 of one frame, the writing operation is executed in time division by dividing pixel data of one frame with respect to each display line in the horizontal direction (row direction) as described in the second embodiment, and applying a pixel data voltage corresponding to each pixel data of one display line to the source line SL in each column for each horizontal period. Hence, a substantial timing to finish the writing operation varies among the display lines in respective rows, and therefore variation is produced in a time width of a stand-by period between an end of the writing operation and start of the self-refresh operation.

Even during the stand-by period, the pixel data voltage is applied to the source line SL for the subsequent writing operation, and therefore a state where the voltage different from the written pixel data voltage is applied to a first terminal of a transistor T1 is likely to continue through the stand-by period in pixel circuits in a row in which the writing operation is finished. In the fifth embodiment, to correct the variation in the time width of the stand-by period, the self-refresh operation is started independently for each display line in each row immediately after the writing operation in each row is finished. To control the self-refresh operation with respect to each row, it is necessary to independently control timings for at least auxiliary gate lines AGL, a first control line SWL and a second control line BST with respect to each row. A voltage supply line VSL does not necessarily need to be independently controlled with respect to each row.

Figure 10:
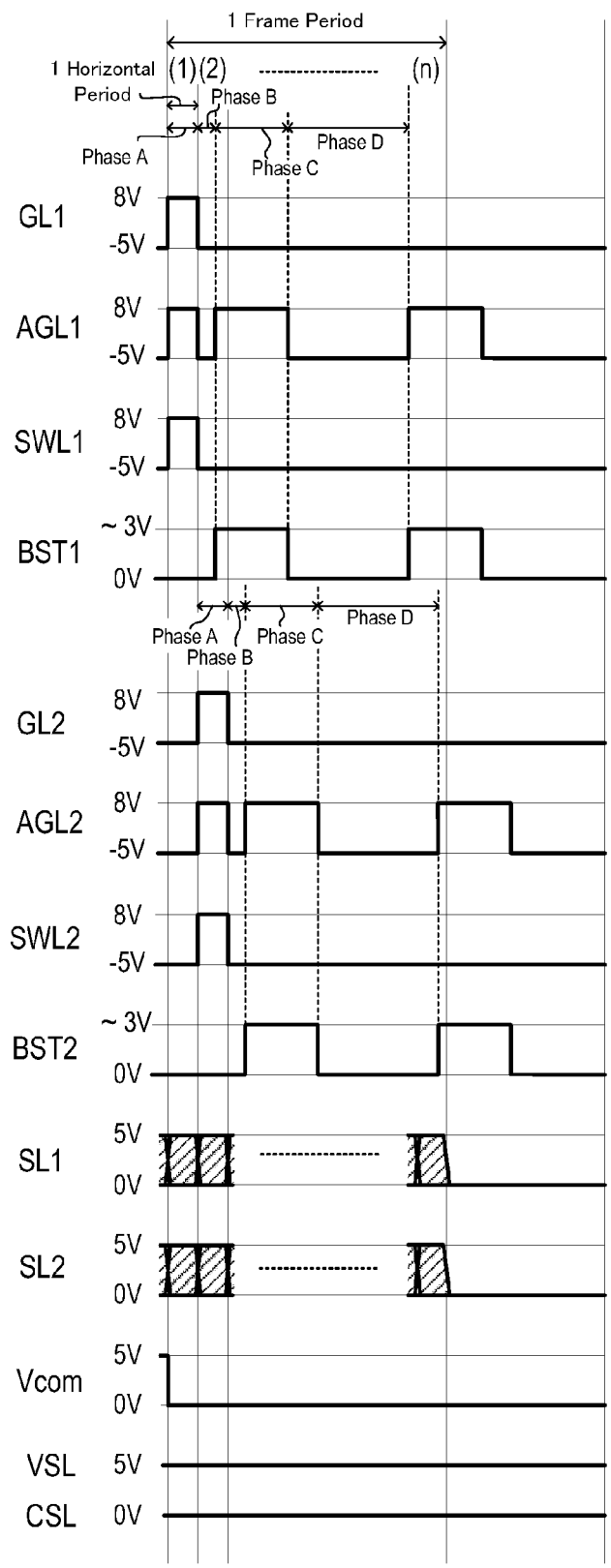
FIG. 10 is a timing diagram illustrating an embodiment of a writing operation and a self-refresh operation of the pixel circuit according to the present invention with respect to each row.
Figure 11:
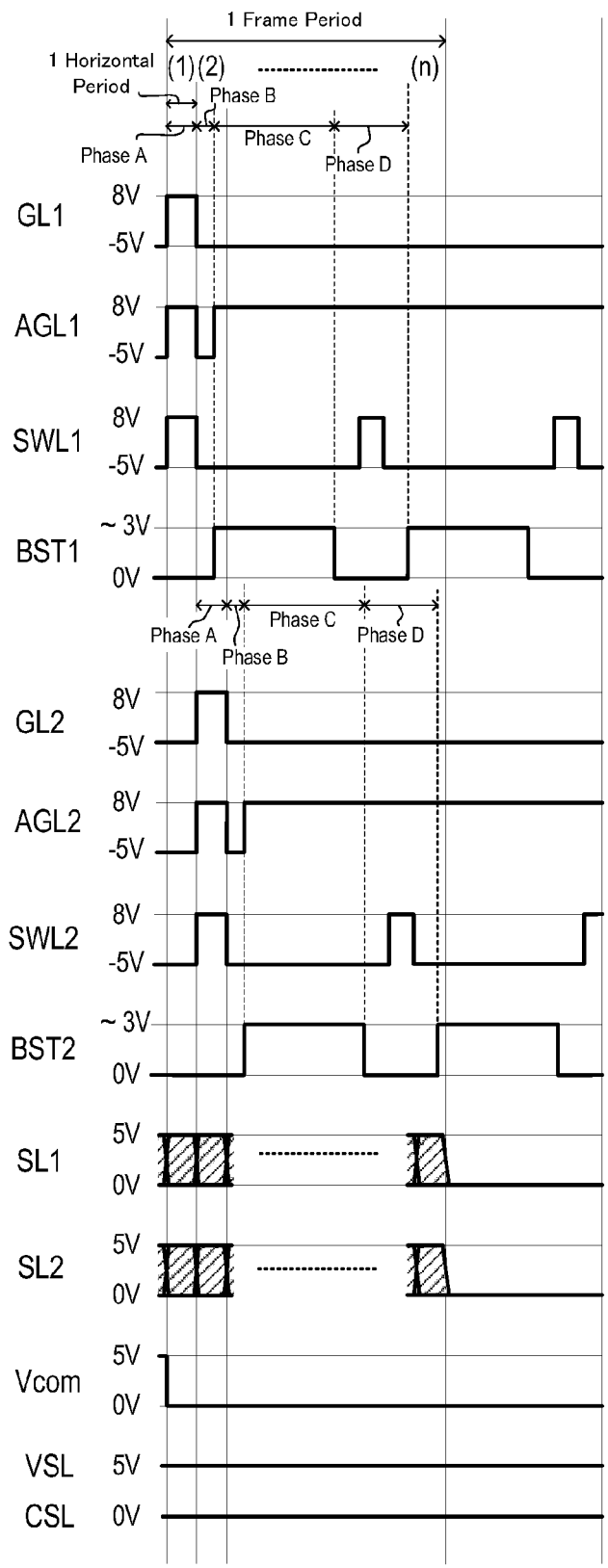
FIG. 11 is a timing diagram illustrating another embodiment of a writing operation and a self-refresh operation of the pixel circuit according to the present invention with respect to each row.

FIGS. 10 and 11 illustrate timing diagrams of the writing operation and the self-refresh operation with respect to each row in the constant display mode when a first type pixel circuit is used. FIG. 10 illustrates that a refresh canceling operation (holding operation) described in the third embodiment is executed in a phase D after the self-refresh main operation in a phase C, and FIG. 11 illustrates that the refresh canceling operation (holding operation) described in the fourth embodiment is executed in the phase D after the self-refresh main operation in the phase C. FIGS. 10 and 11 illustrate each voltage waveform of two gate lines GL1 and GL2, two auxiliary gate lines AGL1 and AGL2, two source lines SL1 and SL2, two first control lines SWL1 and SWL2, two second control lines BST1 and BST2, the voltage supply line VSL and the auxiliary capacity line CSL, and the voltage waveform of the counter voltage Vcom in one frame period. The gate line GL1, the auxiliary gate line AGL1, the first control line SWL1, and the second control line BST1 are connected to the pixel circuits 2 in the same row for which the writing operation is performed in the first horizontal period. Further, the gate line GL2, the auxiliary gate line AGL2, the first control line SWL2, and the second control line BST2 are connected to the pixel circuits 2 in the same row for which the writing operation is performed in the second horizontal period. The auxiliary gate line AGL1, the first control line SWL1, and the second control line BST1 are used to perform the self-refresh operation for pixel circuits in the first row serving as writing operation targets in the first horizontal period, subsequently to the second horizontal period, and the auxiliary gate line AGL2, the first control line SWL2, and the second control line BST2 are used to perform the self-refresh operation for pixel circuits in the second rows serving as writing operation targets in the second horizontal period, subsequently to the third horizontal period.

The writing operation differs from the writing operation described in the second embodiment only in voltage applying conditions of the first control line SWL and the second control line BST with respect to pixel circuits in unselected rows for which the writing operation is finished, and the writing operation for selected rows is completely the same as the writing operation described in the second embodiment. Further, the voltage applying conditions for unselected rows before the writing operation is also the same as the writing operation described in the second embodiment.

The self-refresh operation during the writing operation for one frame differs from the self-refresh operation after the writing operation in that a pixel data voltage to be written in pixel circuits serving as writing operation targets instead of a first reset voltage is applied to the source line SL. However, the self-refresh operations are the same in that the three basic phases (phases A to C) described in the third embodiment are executed by applying the voltage to the first control line SWL and the second control line BST. In addition, the first rest voltage is applied to each source line SL after the writing operation for one frame is finished.

In addition, although a predetermined fixed voltage (0 V in FIGS. 10 and 11) is applied to the auxiliary capacity line CSL, and, in case of a second type pixel circuit, the first control voltage (5 V) is applied to a voltage supply line CSL/VSL functioning as the voltage supply line VSL and the auxiliary capacity line CSL.

Although the self-refresh operation is performed with respect to each row in the fifth embodiment, timing control of the auxiliary gate line AGL, the first control line SWL, and the second control line BST may be changed such that the self-refresh operation is collectively performed at the same time for the pixel circuits 2 of one frame similar to the self-refresh operation according to the third and fourth embodiments after the writing operation for one frame is finished. Further, an operation of repeating the phase C and the phase D subsequent to the first phase D and the second phase C in the phase C and the phase D may be performed after the writing operation for one frame is finished.

Furthermore, in some cases, the self-refresh operation executed after the writing operation for one frame continues for pixel circuits in rows for which the writing operation is not performed during the writing operation period of one frame illustrated in FIGS. 10 and 11. In this case, preferably, during the writing operation period of one frame, voltage application control is collectively performed for the first control line SWL and the second control line BST in all unselected rows for which the writing operation is not performed.

Sixth Embodiment

In the sixth embodiment, a writing operation in a normal display mode of a first type pixel circuit 2 illustrated in FIG. 4 will be described with reference to the drawings.

In the writing operation in the normal display mode, pixel data of one frame is divided with respect to each display line in a horizontal direction (row direction), an analog voltage of multiple tones corresponding to each pixel data of one display line is applied to the source line SL in each column for each horizontal period, a selected row voltage 8 V is applied to a gate line GL and an auxiliary gate line AGL of the selected display line (selected row), first switch circuits 22 of all pixel circuits 2 in the selected row are set to the conducted state, and the voltage of the source line SL in each column is transferred to an internal node N1 of each pixel circuit 2 in the selected row. An unselected row voltage −5 V is applied to the gate line GL other than the selected display line (unselected row) to set the first switch circuits 22 of all pixel circuits 2 in the selected row to the non-conducted state. In addition, the display control circuit 11 illustrated in FIG. 1 controls a timing of applying the voltage to each signal line upon the writing operation described below, and the display control circuit 11, the counter electrode drive circuit 12, the source driver 13, and the gate driver 14 individually apply voltages.

Figure 12:
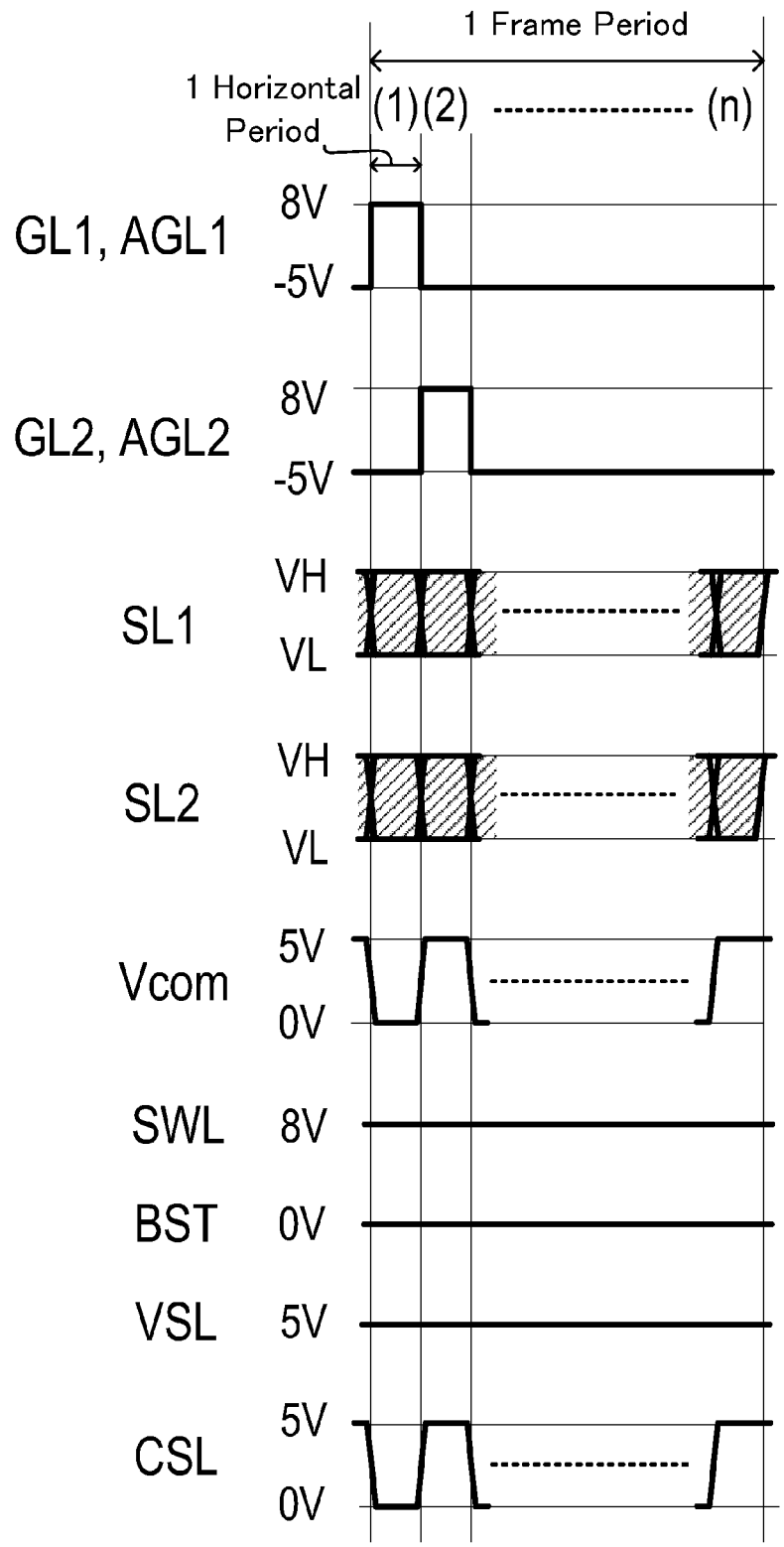
FIG. 12 is a timing diagram of a writing operation of a normal display mode of the pixel circuit according to the present invention.

FIG. 12 illustrates a timing diagram of the writing operation in the normal display mode when a first type pixel circuit is used. FIG. 12 illustrates each voltage waveform of two gate lines GL1 and GL2, two auxiliary gate lines AGL 1 and AGL2, two source lines SL1 and SL2, a first control line SWL, a second control line BST, a voltage supply line VSL and an auxiliary capacity line CSL, and the voltage waveform of the counter voltage Vcom in one frame period.

One frame period is divided into horizontal periods the number of which corresponds to the number of gate lines GL, and the gate lines GL1 to GLn to be selected are sequentially allocated to the respective horizontal periods. FIG. 12 illustrates voltage changes in two gate lines GL1 and GL2 and auxiliary gate lines AGL1 and AGL2 in the first two horizontal periods. The selected row voltage 8V is applied to the gate line GL1 and the auxiliary gate line AGL1 and the unselected row voltage −5 V is applied to the gate line GL2 and the auxiliary gate line AGL2 in the first horizontal period, the selected row voltage 8 V is applied to the gate line GL2 and the auxiliary gate line AGL2 and the unselected row voltage −5 V is applied to the gate line GL1 and the auxiliary gate line AGL1 in the second horizontal period, and the unselected row voltage −5 V is applied to the gate lines GL1 and GL2 and the auxiliary gate lines AGL1 and AGL 2 in subsequent horizontal periods, respectively. An analog voltage of multiple tones (multiple tones are displayed by a cross hatching in FIG. 12) corresponding to each of the pixel data of a display line corresponding to each horizontal period is applied to the source line SL in each column (two source lines SL1 and SL2 are illustrated in FIG. 12 as representatives). In addition, the counter voltage Vcom changes for each horizontal period (counter AC driving), and the analog voltage takes a voltage value depending on the counter voltage Vcom in the same horizontal period. That is, an analog voltage to be applied to the source line SL is set such that a liquid crystal voltage Vlc given from a difference voltage (V20-Vcom) between the counter voltage Vcom and the pixel voltage V20 has different voltage polarities, but takes the same absolute value corresponding to each pixel data between when the counter voltage Vcom is 5V and when the counter voltage Vcom is 0V.

In the pixel circuit 2, a first switch circuit 22 consists of a series circuit of a transistor T1 and a transistor T2, and conduction/non-conduction of the first switch circuit 22 is controlled by performing on/off control of the transistor T1 and the transistor T2 similar to the writing operation in a constant display mode. Further, similar to the writing operation in the constant display mode, it is necessary to set a second switch circuit 23 to a non-conducted state to prevent interference from the voltage supply line VSL in the writing operation, and therefore a first control voltage (5 V in the present embodiment) equal to or more than the maximum voltage of a pixel data voltage (tone voltage) held in an internal node N1 through one frame period is applied to the voltage supply line VSL.

8 V (first switch voltage) which is higher than the first control voltage (5 V) by a threshold voltage (about 2 V) or more is applied to the first control line SWL to set a transistor T4 to the on state at all times irrespectively of the voltage state of the internal node N1 during one frame period. By this means, the output node N3 and the internal node N1 are electrically connected with each other, and the output node N3 and the intermediate node N2 have the same potential. As a result, it is possible to use a first capacitative element C1 connected to the internal node N1 through the transistor T4 to hold the pixel voltage V20, and contribute to the stabilization of the pixel voltage V20. Further, the second control line BST is fixed to a predetermined fixed voltage (for example, 0 V: first boost voltage).

As described above, the counter voltage Vcom is counter-AC-driven for each horizontal period, and the auxiliary capacity line CSL is driven to have the same potential as the counter voltage Vcom. This is because a pixel electrode 20 capacitive-couples to a counter electrode 30 through a liquid crystal layer and also capacitive-couples to the auxiliary capacity line CSL through the auxiliary capacitative element C2, and therefore, when the voltage on the auxiliary capacity line CSL side of the auxiliary capacitative element C2 is fixed, the change of the counter voltage Vcom is distributed between the auxiliary capacity line CSL and the auxiliary capacitative element C2 and appears in the pixel electrode 20, and the liquid crystal voltage Vlc of the pixel circuits 2 in unselected rows fluctuates. Consequently, by driving all the auxiliary capacity lines CSL at the same voltage as the counter voltage Vcom, the voltages of the counter electrode 30 and the pixel electrode 20 change in the same voltage direction, so that it is possible to suppress fluctuation of the liquid crystal voltage Vlc of the pixel circuits 2 in the unselected rows.

In addition, in the writing operation in the normal display mode, a method of inverting the polarity of each display line for each horizontal period includes a method of applying a predetermined fixed voltage to the counter voltage 30 as the counter voltage Vcom in addition to above "counter AC driving". In this case, the voltage applied to the pixel voltage 20 is switched for each horizontal period between a positive voltage and a negative voltage based on the counter voltage Vcom. In this case, there are a method of directly writing the pixel voltage through the source line SL, and a method of writing the voltage within a range centered around the counter voltage Vcom, and then adjusting the voltage so that the voltage is one of the positive voltage and the negative voltage based on the counter voltage Vcom by way of capacitative coupling using the auxiliary capacitative element C2. In this case, the auxiliary capacity lines CSL are individually pulse-driven with respect to each row without being driven at the same voltage as the counter voltage Vcom.

In addition, a method of inverting the polarity of each display line for each horizontal line in the writing operation in the normal display mode is employed in the sixth embodiment to overcome the following inconvenience which occurs when the polarity is inverted for each frame. In addition, the method of overcoming this inconvenience includes a method of inverting the polarity and performing driving for each column and a method of inverting the polarity and performing driving for each pixel in row and column directions at the same time.

A case will be assumed where the liquid crystal voltage Vlc of the positive polarity is applied to all pixels in a given frame F1, and the liquid crystal voltage Vlc of the negative polarity is applied to all pixels in the next frame F2. Even when the voltage of the same absolute value is applied to the liquid crystal layer, a minute difference is produced in the transmittance of light depending on whether the voltage has the positive polarity or the negative polarity. When a high quality still image is displayed, the presence of this minute difference is likely to produce a minute change in a display condition in the frame F1 and the frame F2. Further, even upon displaying movie, a minute change in a display condition is likely to be produced in a display area which provides the same display content between frames. A case is assumed where, upon displaying high quality still image or movie, even such a minute change can be visually recognized.

Further, the normal display mode is a mode for displaying such a high quality still image or movie, and therefore the above minute change is likely to be visually recognized. To avoid such as phenomenon, the polarity is inverted for each display line in the same frame in the present embodiment. By this means, the liquid crystal voltages Vlc of different polarities between display lines in the same frame are applied, so that it is possible to prevent an influence on display image data based on the polarity of the liquid crystal voltage Vlc.

As illustrated in FIG. 12, in the writing operation in the normal display mode, the voltage supply line VSL and the auxiliary capacity line CSL are independently controlled for counter AC driving and the polarity is inverted for each display line. Therefore, the writing operation in the normal display mode cannot be applied when a second type pixel circuit illustrated in FIG. 6 is used. However, by connecting to the transistor T3 in series another transistor element which is turned off upon the writing operation and is turned on upon the self-refresh operation in the second switch circuit 23 employing the circuit configuration illustrated in FIG. 6, it is possible to give the same voltage change as the counter voltage Vcom to the voltage supply line CSL/VSL.

Another Embodiment

Another embodiment will be described below.

(1) In the above embodiments, upon writing operations in a normal display mode and a constant display mode, a first switch voltage (8V) is applied to a first control line SWL, the potential is made to the same between an output node N3 and an internal node N1 and a second switch circuit 23 is set to the non-conducted state by applying a first control voltage (5 V) to a voltage supply line VSL. Therefore, when the second switch circuit 23 is consists of not only a transistor T3 but also a series circuit of the transistor T3 and another control transistor, it is possible to set the second switch circuit 23 to the non-conducted state upon the writing operation by directly performing on/off control of the control transistor. Consequently, it is not always necessary to perform control of applying the first switch voltage (8 V) to the first control line SWL and applying the first control voltage (5 V) to the voltage supply line VSL.

(2) In the third and fourth embodiments, a description is made of a case where the self-refresh operation is performed targeting all pixel circuits with respect to each frame, and in the fifth embodiment, a description is made of a case where the self-refresh operation is performed targeting pixel circuits in the same row with respect to each row. For example, one frame may be divided into a plurality of row groups each including a predetermined number of rows, and the self-refresh operation may be executed with respect to each row group. For example, one frame is divided into a group of four rows and every time the writing operation is finished for each group of four rows, the self-refresh operation may be collectively performed at the same time for pixel circuits in the group of the four rows. Consequently, it is possible to reduce the number of signal lines related to independent timing control, and simplify control.

(3) In the above embodiments, all pixel circuits 2 formed on the active matrix substrate 10 employ a configuration having the second switch circuit 23 and a control circuit 24. By contrast with this, in case of a configuration having two types of pixel units of transmissive pixel unit which provide transmissive liquid crystal display and reflective pixel unit which provide reflective liquid crystal display on the active matrix substrate 10, only each of the pixel circuits of the reflective pixel unit have the second switch circuit 23 and the control circuit 24 and each of the pixel circuits of the transmissive display unit does not have the second switch circuit 23 and the control circuit 24. In this case, the transmissive pixel unit displays an image in the normal display mode, and the reflective pixel unit displays an image in the constant display mode. According to this configuration, it is possible to reduce the number of elements formed on an entire active matrix substrate 10.

(4) Although each pixel circuit 2 employs a configuration having the capacitative element C2 in the above embodiments, each pixel circuit 2 may employ a configuration without the auxiliary capacitative element C2. In this case, the auxiliary capacity line CSL is not required, and the first type pixel circuit 2 and the second type pixel circuit 2 employ the same configuration.

Figure 13:
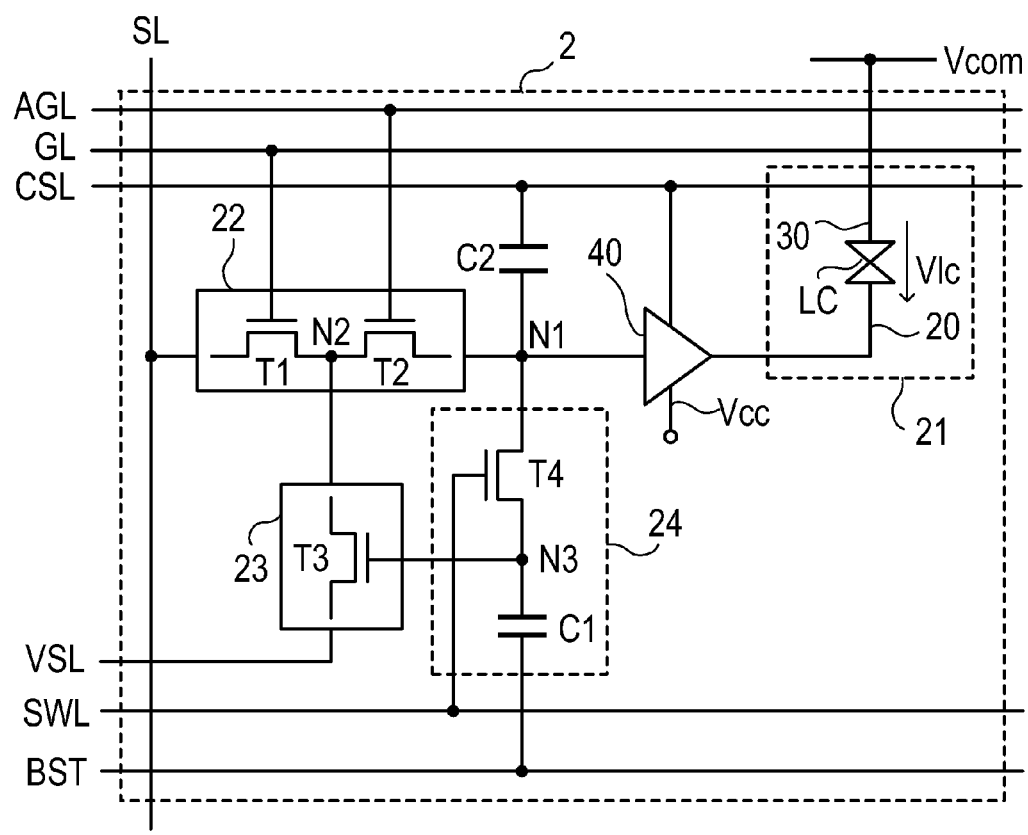
FIG. 13 is a circuit diagram illustrating another embodiment of a basic circuit configuration of the pixel circuit according to the present invention.
Figure 14:
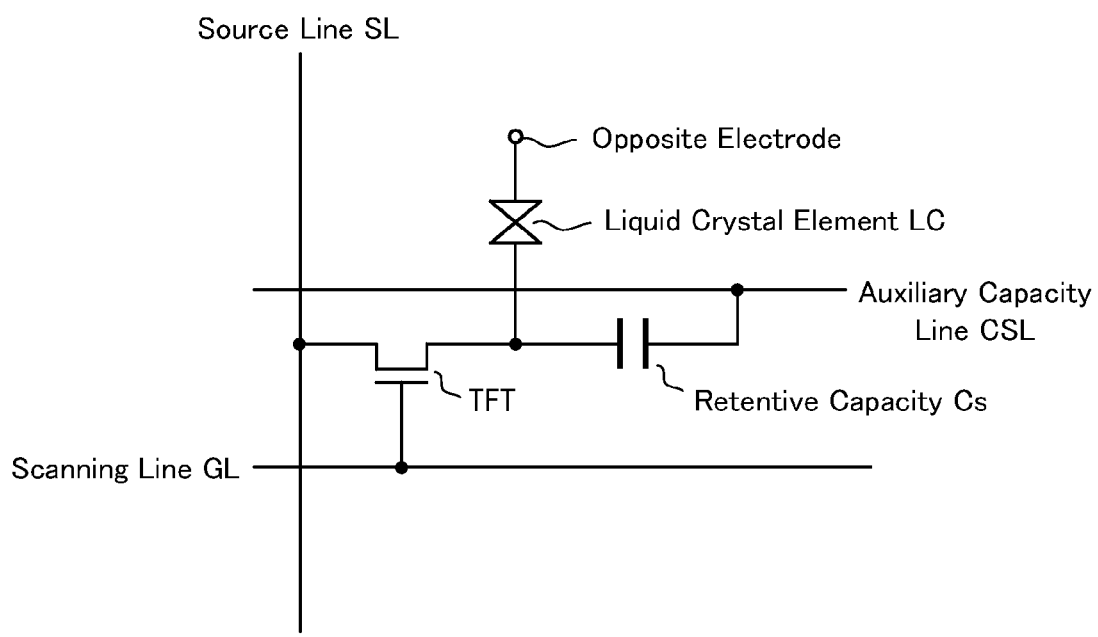
FIG. 14 illustrates an equivalent circuit of a pixel circuit of a common active matrix liquid crystal display device.
Figure 15:
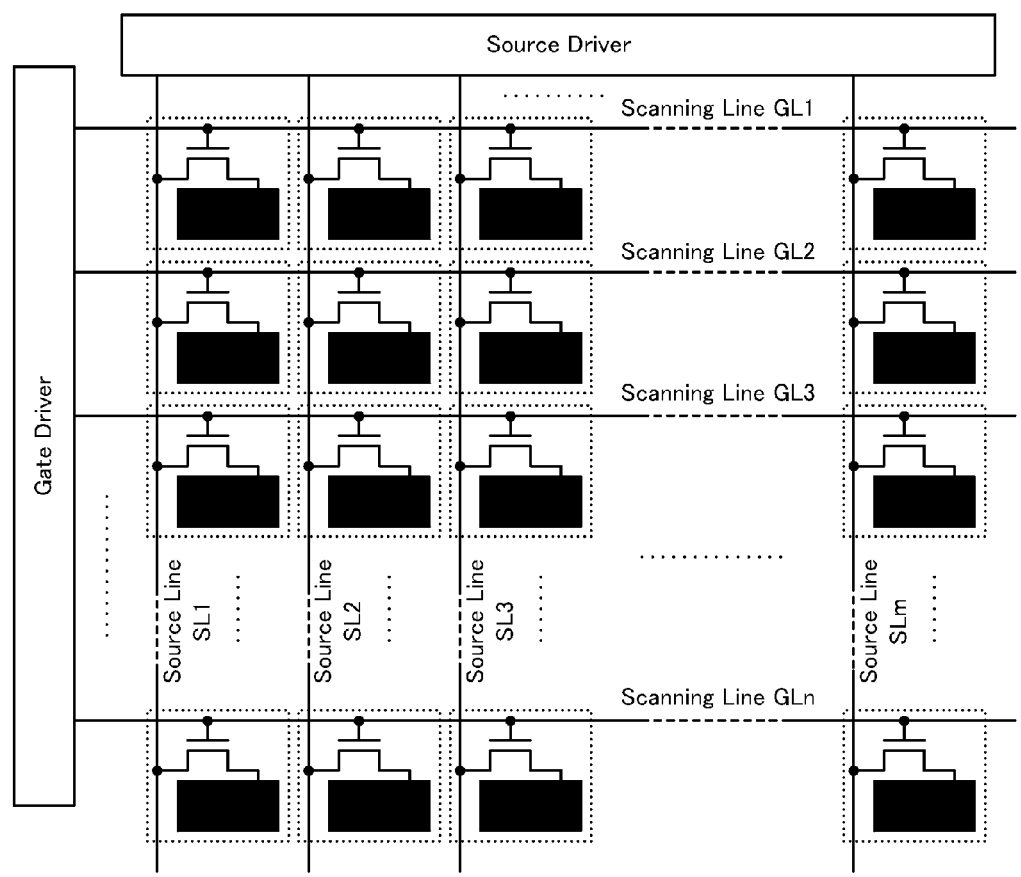
FIG. 15 illustrates an example of a circuit arrangement in an active matrix liquid display device of m×n pixels.
Figure 16:
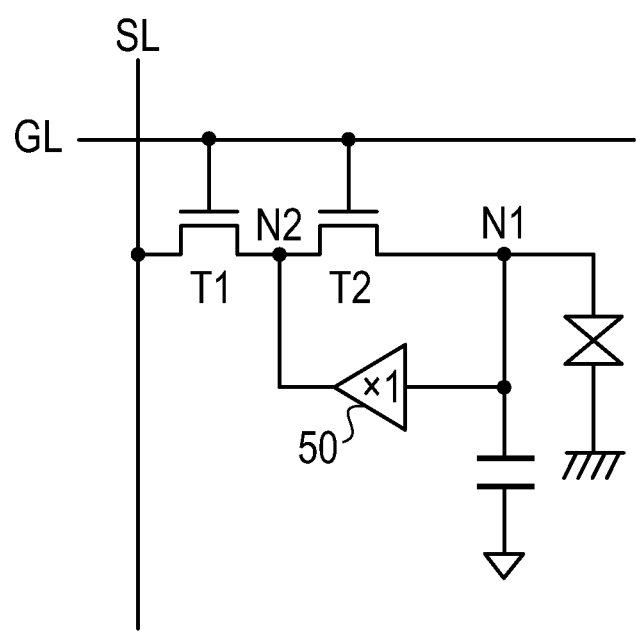
FIG. 16 is an equivalent circuit diagram illustrating an example of a conventional pixel circuit having a buffer amplifier of a unity gain.
Figure 17:
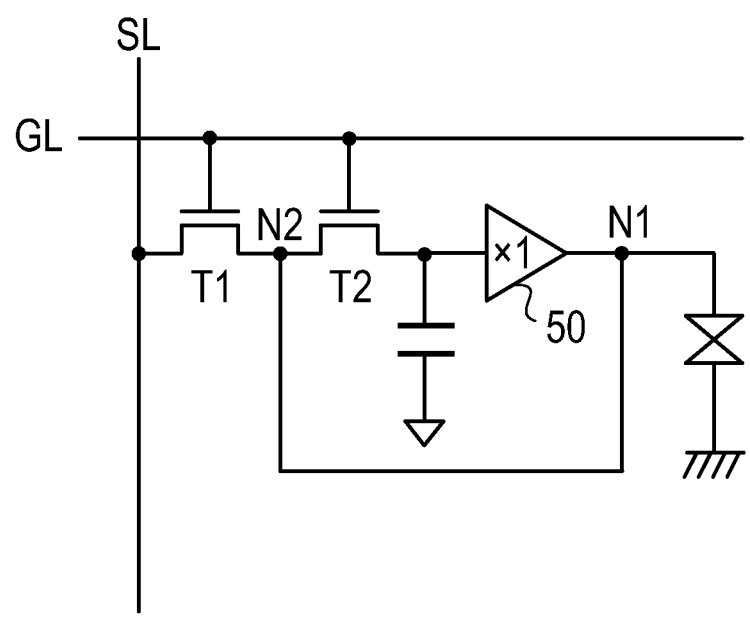
FIG. 17 is an equivalent circuit diagram illustrating another example of a conventional pixel circuit having a buffer amplifier of a unity gain.

(5) Although a cases where a display element unit 21 of each pixel circuit 2 consists of only a unit liquid crystal display element LC is assumed in the above embodiments, the display element unit 21 may employ a configuration having an analog amplifier 40 (voltage amplifier) between the internal node N1 and the pixel electrode 20 as illustrated in FIG. 13. FIG. 13 illustrates, for example, configuration where an auxiliary capacity line CSL and a power source line Vcc are inputted as power source lines for the analog amplifier 40.

In this case, the voltage given to the internal node N1 is amplified by an amplification factor η set by the analog amplifier 40, and the amplified voltage is supplied to the pixel electrode 20. Consequently, this configuration can reflect a minute voltage change of the internal node N1 in a display image.

(6) Although transistors T1 to T4 in the pixel circuit 2 are assumed to be N channel type polysilicon TFT in the above embodiments, it may be possible to employ a configuration using P channel type TFTs or employ a configuration using amorphous silicon TFTs. A display device employing the configuration using the P channel type TFTs can also operate the pixel circuits 2 similar to each of the above embodiments by processing of, for example, inverting positive and negative values of a power voltage and a voltage value shown as the above operation conditions, providing the same effect.

(7) Although voltage values of the pixel voltage V20 and the counter voltage Vcom in the constant display mode are assumed to be 0 V and 5 V, and voltage values applied to each signal line are set to −5 V, 0 V, 5 V and 8 V according to the voltage values in the above embodiments, these voltage values can be adequately changed according to characteristics (for example, thresholds voltage) of liquid crystal elements and transistor elements to use.

EXPLANATION OF REFERENCES

1: DISPLAY DEVICE
2: PIXEL CIRCUIT
10: ACTIVE MATRIX SUBSTRATE
11: DISPLAY CONTROL CIRCUIT
12: COUNTER ELECTRODE DRIVE CIRCUIT
13: SOURCE DRIVER
14: GATE DRIVER
20: PIXEL ELECTRODE
21: DISPLAY ELEMENT UNIT
22: FIRST SWITCH CIRCUIT
23: SECOND SWITCH CIRCUIT
24: CONTROL CIRCUIT
30: COUNTER ELECTRODE
31: COUNTER SUBSTRATE
32: SEALING MEMBER
33: LIQUID CRYSTAL LAYER
40: ANALOG AMPLIFIER
AGL (AGL1, AGL2, . . . and AGLn): AUXILIARY GATE LINE
BST: SECOND CONTROL LINE
C1: FIRST CAPACITATIVE ELEMENT
C2: AUXILIARY CAPACITATIVE ELEMENT
CML: COUNTER ELECTRODE WIRING
CSL: AUXILIARY CAPACITY LINE
CSL/VSL: VOLTAGE SUPPLY LINE
Ct: TIMING SIGNAL
DA: DIGITAL IMAGE SIGNAL
Dv: DATA SIGNAL
GL (GL1, GL2, . . . and GLn): GATE LINE
Gtc: SCAN SIDE TIMING CONTROL SIGNAL
LC: UNIT LIQUID CRYSTAL DISPLAY ELEMENT N1: INTERNAL NODE
N2: INTERMEDIATE NODE
N3: OUTPUT NODE
SWL: FIRST CONTROL LINE
Scc: COUNTER VOLTAGE CONTROL SIGNAL
SL (SL1, SL2, . . . and SLm): SOURCE LINE
Ste: DATA SIDE TIMING CONTROL SIGNAL
T1, T2, T3, T4: TRANSISTOR
V20: PIXEL VOLTAGE
Vcom: COUNTER VOLTAGE
Vlc: LIQUID CRYSTAL VOLTAGE
VSL: VOLTAGE SUPPLY LINE

The invention claimed is:

1. A pixel circuit comprising:
a display element unit including a unit liquid crystal display element;
an internal node forming part of the display element unit and holding a pixel data voltage applied to the display element unit;
a first switch circuit including a series circuit of first and second transistor elements, having one end connected with a data signal line and the other end connected with the internal node, and transferring to the internal node the pixel data voltage supplied from the data signal line through the series circuit;
a second switch circuit including a third transistor element, and having one end connected with a predetermined voltage supply line and the other end connected with an intermediate node which is a connection point where the first and second transistor elements in the series circuit are connected in series; and
a control circuit formed with a series circuit of a fourth transistor element and a first capacitative element, holding the pixel data voltage held in the internal node, at one end of the first capacitative element through the fourth transistor element, and controlling conduction of the third transistor element by a boost voltage applied to the other end of the first capacitative element, wherein
each of the first to fourth transistor elements includes a first terminal, a second terminal and a control terminal that controls conduction between the first and second terminals,
the control terminal of the first transistor element is connected with a first scan signal line setting the first transistor element to a conducted state upon an operation of transferring the pixel data voltage to the internal node,
the control terminal of the second transistor element is connected with a second scan signal line setting the second transistor element to a conducted state upon an operation of transferring the pixel data voltage to the internal node,
the control terminal of the third transistor element, the second terminal of the fourth transistor element, and the one end of the first capacitative element are connected to each other, and form an output node of the control circuit,
the first terminal of the fourth transistor element is connected with the internal node,
the control terminal of the fourth transistor element is connected with a first control line,
the other end of the first capacitative element is connected with a second control line supplying the boost voltage,
upon a self-refresh operation of compensating for voltage fluctuation of the pixel data voltage held in the internal node, using a voltage held in the output node,
a first control voltage equal to or more than a maximum voltage of the pixel data voltage held in the internal node is applied to the voltage supply line, a voltage setting the first transistor element to a non-conducted state is applied to the first scanning line, and a voltage setting the second transistor element to a conducted state is applied to the second scanning line, and,
in a state where the internal node and the output node have the same potential through the fourth transistor element, the fourth transistor element transitions from a conducted state to a non-conducted state, and thereafter the boosting voltage is applied to the other end of the first capacitative element, thereby boosting the voltage of the output node to a second control voltage obtained by adding a threshold voltage of the third transistor element to the pixel data voltage held in the internal node.

2. The pixel circuit according to claim 1, wherein
the first switch circuit consists of the series circuit of the first and second transistor elements, and
the first terminal of the first transistor element is connected with the data signal line, the second terminal of the first transistor element and the first terminal of the second transistor element are connected with the intermediate node, and the second terminal of the second transistor element is connected with the internal node.

3. The pixel circuit according to claim 1, wherein
the second switch circuit consists of the third transistor element, and
the first terminal of the third transistor element is connected with the voltage supply line, and the second terminal of the third transistor element is connected with the intermediate node.

4. The pixel circuit according to claim 1, further comprising a second capacitative element having one end connected to the internal node and the other end connected to a third control line or the voltage supply line.

5. A display device in which
a plurality of pixel circuits are arranged in a row direction and a column direction to form a pixel circuit array, each of the pixel circuits being the pixel circuit according to claim 1,
the data signal line is provided for each of columns,
the first scan signal line is provided for each of rows,
the one ends of the first switch circuits in the pixel circuits arranged in the same column are connected to the common data signal line,
the control terminals of the first transistor elements in the pixel circuits arranged in the same row are connected to the common first scan signal line,
the control terminals of the second transistor elements in the pixel circuits arranged in the same row are connected to the common second scan signal line,
the one ends of the second switch circuits in the pixel circuits arranged in the same row or the same column are connected to the common voltage supply line,
the control terminals of the fourth transistor elements in the pixel circuits arranged in the same row or the same column are connected to the common first control line,
the other ends of the first capacitative elements in the pixel circuits arranged in the same row or the same column are connected to the common second control line,
the display device comprising:
a data signal line drive circuit individually driving the data signal lines;
a scan signal line drive circuit individually driving the first scan signal lines and individually or commonly driving the second scan signal lines;
a voltage supply line drive circuit individually or commonly driving the voltage supply lines; and a control line drive circuit individually or commonly driving the first control lines and individually or commonly driving the second control lines.

6. The display device according to claim 5, wherein
in the pixel circuits arranged in the same row, the one ends of the second switch circuits are connected to the common voltage supply line,
in the pixel circuits arranged in the same row, the control terminals of the fourth transistor elements are connected to the common first control line, and
in the pixel circuits arranged in the same row, the other ends of the first capacitative elements are connected to the common second control line.

7. The display device according to claim 5, wherein,
upon a writing operation of writing pixel data including two tones or more individually in the pixel circuits arranged in one selected row,
the scan signal line drive circuit applies a predetermined selected row voltage to the first and second scan signal lines in the selected row to set the first and second transistor elements arranged in the selected row to a conducted state so as to activate the first switch circuits, and applies a predetermined unselected row voltage to the first scan signal line in a row other than the selected row to set the first transistor elements arranged in the row other than the selected row to a non-conducted state so as to deactivate the first switch circuits, and
the data signal line drive circuit individually applies a pixel data voltage corresponding to pixel data to be written in the pixel circuit in each column of the selected row, to each of the data signal lines.

8. The display device according to claim 7, wherein,
upon the writing operation,
the voltage supply line drive circuit applies a first control voltage equal to or more than the maximum voltage of the pixel data voltage held in the internal node, to the voltage supply line connected to the pixel circuits arranged in the selected row, and
the control line drive circuit applies a first switch voltage to the first control line connected to the pixel circuits arranged in the selected row, and a first boost voltage to the second control line connected to the pixel circuits arranged in the selected row.

9. The display device according to claim 8, wherein,
upon the writing operation,
the voltage supply line drive circuit applies the first control voltage to the voltage supply line connected to the pixel circuits arranged in the row other than the selected row, and
the control line drive circuit applies the first switch voltage to the first control line connected to the pixel circuits arranged in the row other than the selected row, and the first boost voltage to the second control line connected to the pixel circuits arranged in the row other than the selected row.

10. The display device according to claim 8, wherein the first switch voltage is a sufficient voltage to make the fourth transistor element enter a conducted state, and make the internal node and the output node have the same potential.

11. The display device according to claim 5, wherein,
upon the self-refresh operation which is performed, after a writing operation of writing pixel data individually comprising two tones or more in the pixel circuits arranged in one selected row is finished in each row or all rows of the pixel circuit array, with respect to the pixel circuits for which the writing operation is finished,
the scan signal line drive circuit applies the unselected row voltage to the first scan signal line in at least one control target row for which the writing operation is finished to set the first transistor elements of the pixel circuits arranged in the control target row to a non-conducted state, and applies the selected row voltage to the second scan signal line in the control target row to set the second transistor elements of the pixel circuits arranged in the control target row to a conducted state,
the voltage supply line drive circuit applies a first control voltage equal to or more than the maximum voltage of the pixel data voltage held in the internal node, to the voltage supply line connected to the pixel circuits arranged in the control target row, and,
in a state where the control line drive circuit applies a first switch voltage setting the fourth transistor elements to a conducted state, to the first control line connected to the pixel circuits arranged in the control target row so that the internal node and the output node have the same potential, the control line drive circuit applies a second switch voltage setting the fourth transistor elements to a non-conducted state to electrically separate the internal node and the output node, and, subsequently, changes a voltage of the second control line connected to the pixel circuits arranged in the control target row from a first boost voltage to a second boost voltage, and boosts a voltage of the output node to a second control voltage obtained by adding a threshold voltage of the third transistor element to the pixel data voltage held in the internal node by way of capacitive coupling through the first capacitative element.

12. The display device according to claim 11, wherein,
upon the self-refresh operation,
when a certain period of time passes after the voltage of the second control line connected to the pixel circuits arranged in the control target row is changed from a first boost voltage to a second boost voltage, the control line drive circuit performs a refresh canceling operation of returning the voltage of the second control line connected to the pixel circuits arranged in the control target row from the second boost voltage to the first boost voltage and, subsequently, returning the voltage of the first control line connected to the pixel circuits arranged in the control target row from the second switch voltage to the first switch voltage so as to make the internal node and the output node have the same potential, and
when a certain period of time passes after the refresh canceling operation, the control line drive circuit performs at least once or more a repeating operation of changing the voltage of the first control line connected to the pixel circuits arranged in the control target row from the first switch voltage to the second switch voltage, changing the voltage of the second control line connected to the pixel circuits arranged in the control target row from a first boost voltage to a second boost voltage and, subsequently, after a certain period of time passes, executing the refresh canceling operation again.

13. The display device according to claim 11, wherein,
upon the self-refresh operation,
when a certain period of time passes after the voltage of the second control line connected to the pixel circuits arranged in the control target row is changed from a first boost voltage to a second boost voltage, the control line drive circuit performs a refresh canceling operation of changing the voltage of the second scan signal line connected to the pixel circuits arranged in the control target row from the selected row voltage to the unselected row voltage, and returning the voltage of the second control line connected to the pixel circuits arranged in the control target row from the second boost voltage to the first boost voltage, and when a certain period of time passes after the refresh canceling operation, the control line drive circuit performs at least once or more a repeating operation of changing the voltage of the second scan signal line in the control target row from the unselected row voltage to the selected row voltage, changing the voltage of the second control line connected to the pixel circuits arranged in the control target row from a first boost voltage to a second boost voltage and, subsequently, after a certain period of time passes, executing the refresh canceling operation again.

14. The display device according to claim 11, wherein the control line drive circuit performs a first operation of applying the first switch voltage to the first control line connected to the pixel circuits arranged in the control target row so as to make the internal node and the output node have the same potential upon the writing operation with respect to the pixel circuits arranged in the control target row.

15. The display device according to claim 11, wherein, when the control terminals of the fourth transistor elements of the pixel circuits arranged in the same row are connected to the common first control line and the other ends of the first capacitative elements of the pixel circuits arranged in the same row are connected to the common second control line, every time the writing operation is finished with respect to each row of the pixel circuit array, the self-refresh operation is started for the pixel circuits in the control target row for which the writing operation is finished, without waiting for the writing operation for all rows to be finished.

16. The display device according to claim 11, wherein, when the self-refresh operation is performed after the writing operation is finished for all rows of the pixel circuit array, a first reset voltage equal to or less than a minimum voltage of the pixel data voltage held in the internal node is applied to all of the data signal lines.

* * * * *